United States Patent [19]
Elliott et al.

[11] 4,112,494
[45] Sep. 5, 1978

[54] REFINERY AND PIPELINE MONITORING SYSTEM

[76] Inventors: Peter F. D. Elliott; Kenneth Elliott, P.O. Box 31227, Cincinnati, Ohio 45231

[21] Appl. No.: 704,538

[22] Filed: Jul. 12, 1976

[51] Int. Cl.² .................. G01M 3/28; G01F 1/00; G06F 15/46
[52] U.S. Cl. ...................... 364/510; 73/40.5 R; 235/92 PD; 235/92 FL; 364/500
[58] Field of Search ......... 235/151.34, 92 FL, 92 PD; 73/40.5 R, 40, 196; 364/500, 496, 510

[56] References Cited

U.S. PATENT DOCUMENTS

| | | | |
|---|---|---|---|
| 3,505,513 | 5/1968 | Fowler et al. | 235/151.34 |
| 3,690,150 | 9/1972 | Mullen | 73/40.5 R |
| 3,723,987 | 3/1973 | Barone, Jr. et al. | 73/196 X |
| 3,909,596 | 9/1975 | Sullivan | 235/151.34 X |
| 3,952,759 | 4/1976 | Ottenstein | 235/151.34 X |
| 3,987,662 | 10/1976 | Hara et al. | 235/151.34 X |

*Primary Examiner*—Edward J. Wise
*Attorney, Agent, or Firm*—Wood, Herron & Evans

[57] ABSTRACT

A system is disclosed which indicates a series of intermittent losses of fluid between any two stations along a fluid flow system such as a refinery or pipeline. The series of intermittent losses relates to a chain of intervals of operation of the fluid flow system. A sudden disturbance in the operation of the fluid flow system during an interval of operation is smoothed over a selectively variable number of intermittent loss indications in the series rather than reflected entirely in the intermittent loss indication for the interval of operation in which the sudden disturbance occurs. On the other hand, actual changes in the operation of the fluid flow system are averaged over the selectively variable number of intermittent loss indications in the series so that rapid changes as well as gradual changes in the operation of the fluid flow system result in a trend in the series of intermittent losses. This permits personnel to reliably monitor the fluid flow system and, therefore, facilitates repair or adjustment of the operation of the fluid flow system only when it is needed. The system also provides an overall loss indication for a period in the operation of the fluid flow system based on the total amount of fluid input to and output from the fluid flow system. The system determines the beginning of the overall loss period by indicating a predetermined status in the operation of the fluid flow system. The system determines the end of the overall loss period by indicating a return in the operation of the fluid flow system to the predetermined status. This eliminates error in the overall loss indication. The system also provides correlation of fluid flow meters during the operation of the fluid flow system.

14 Claims, 17 Drawing Figures

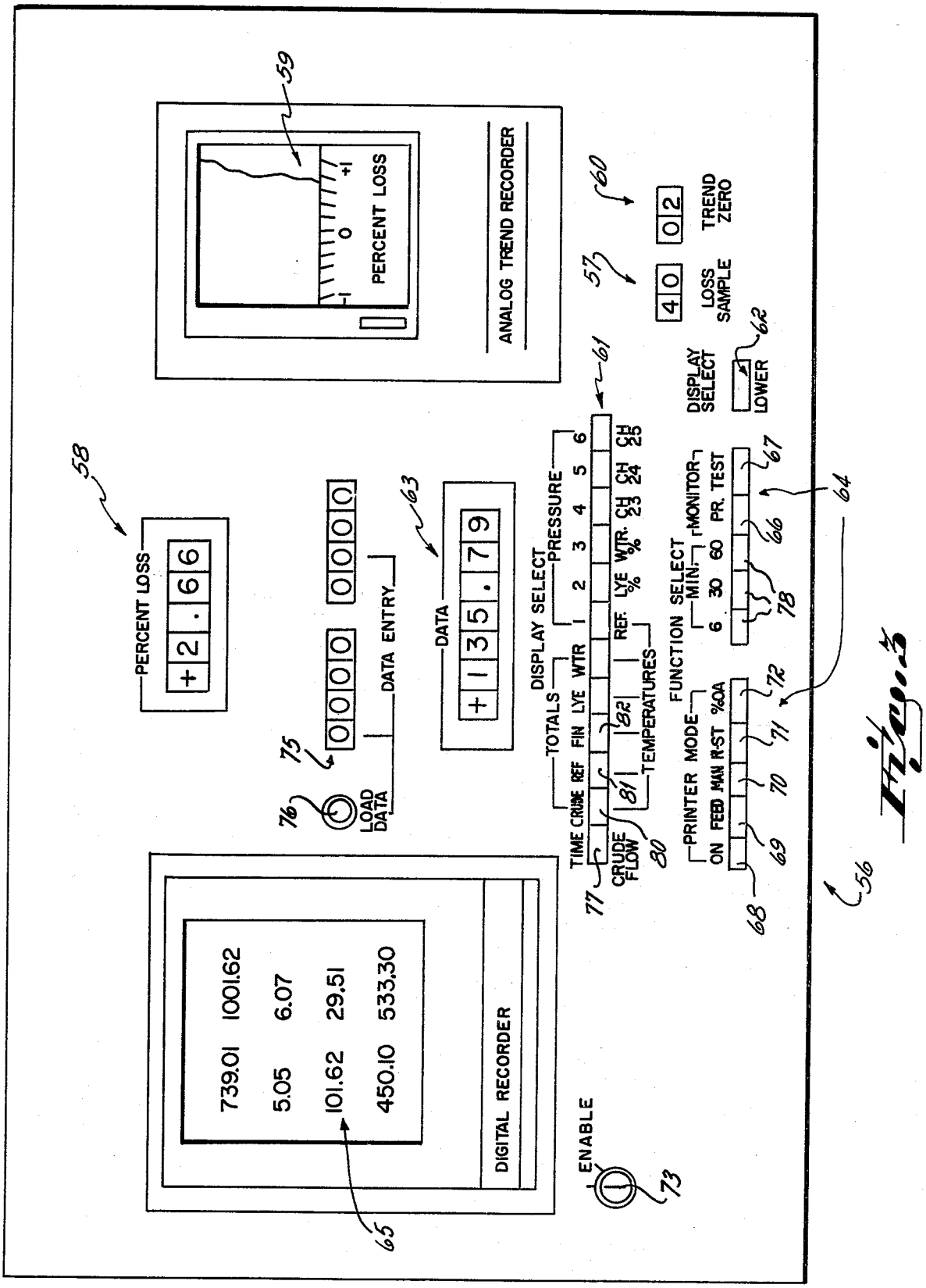

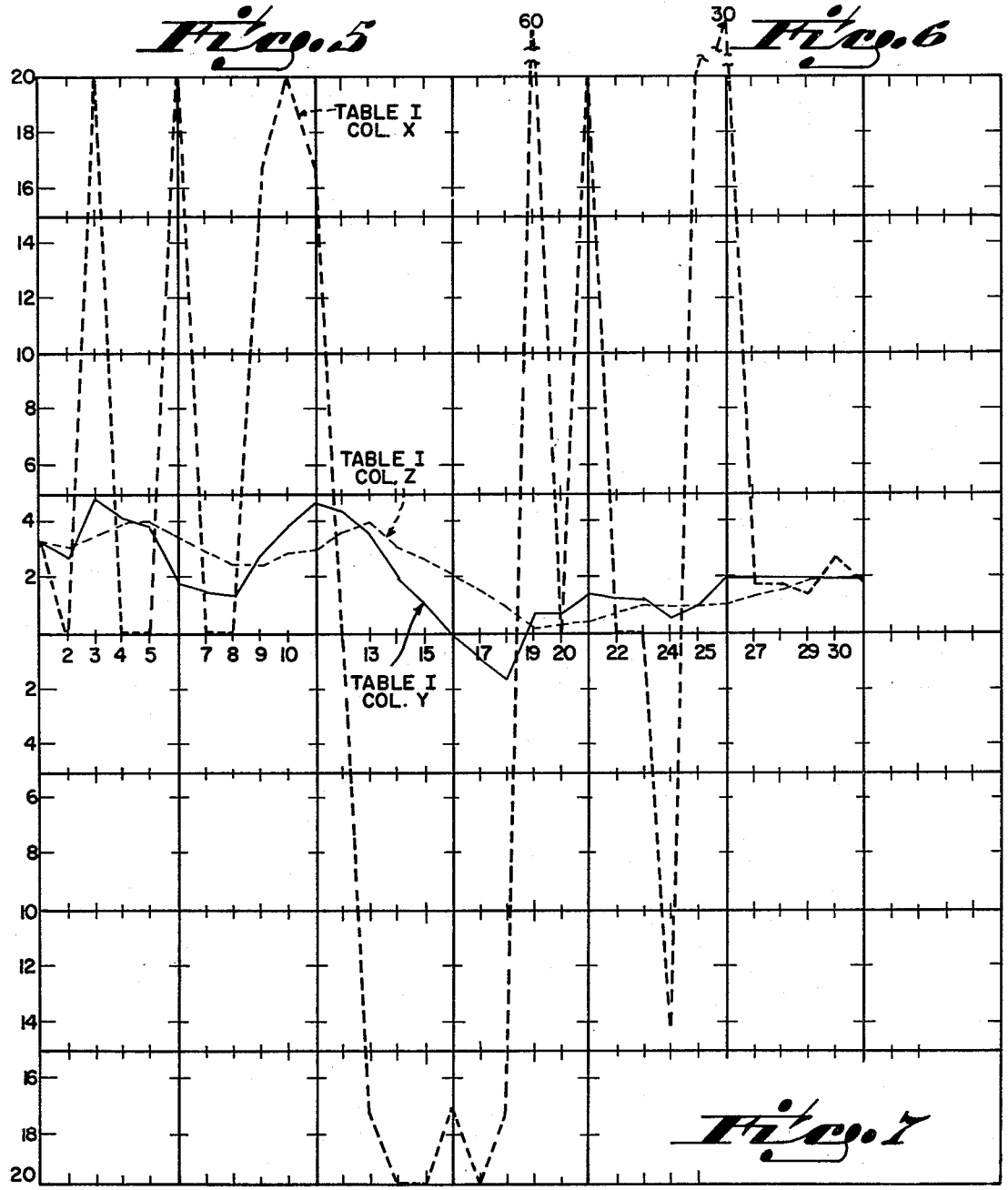

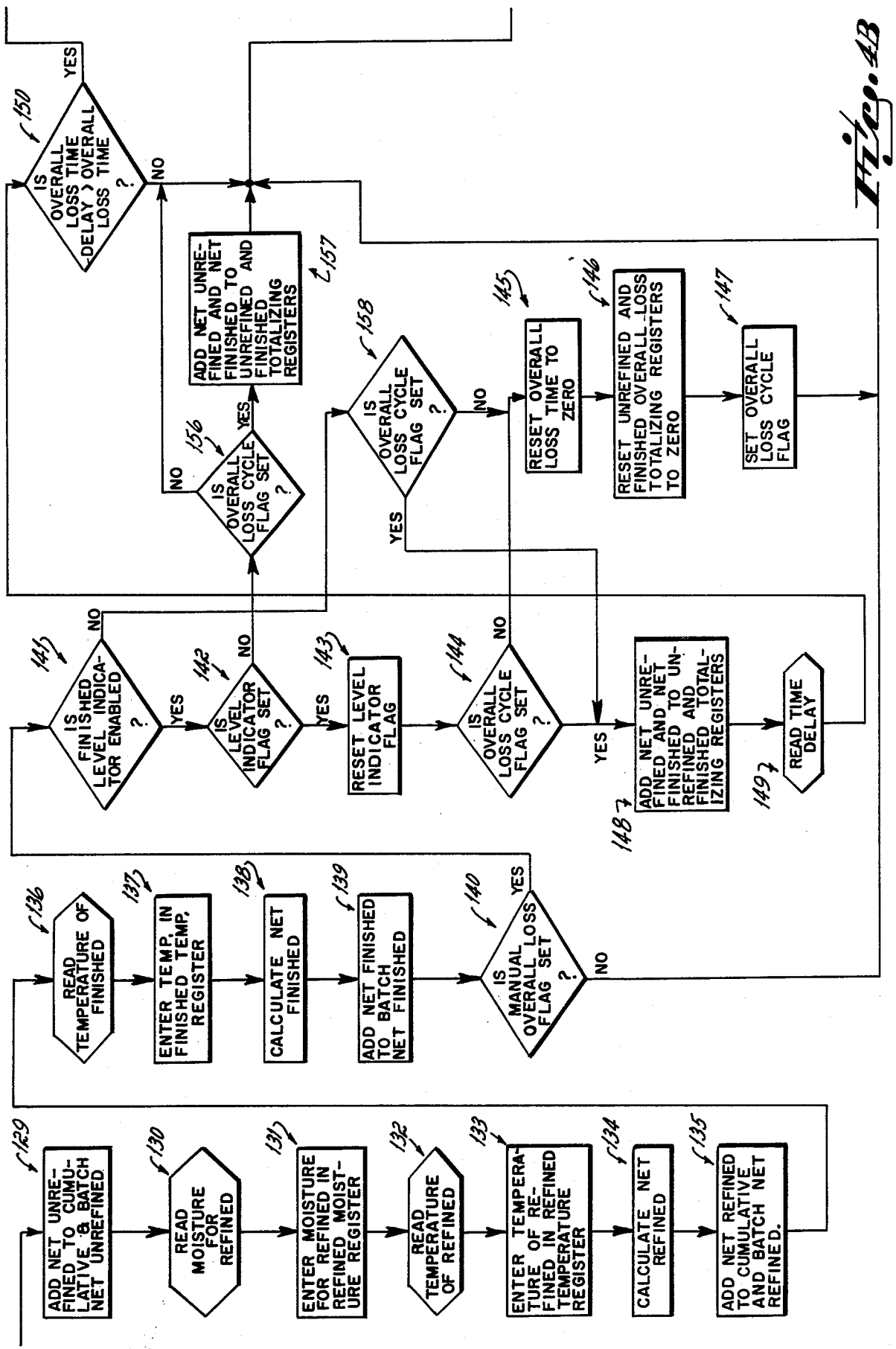

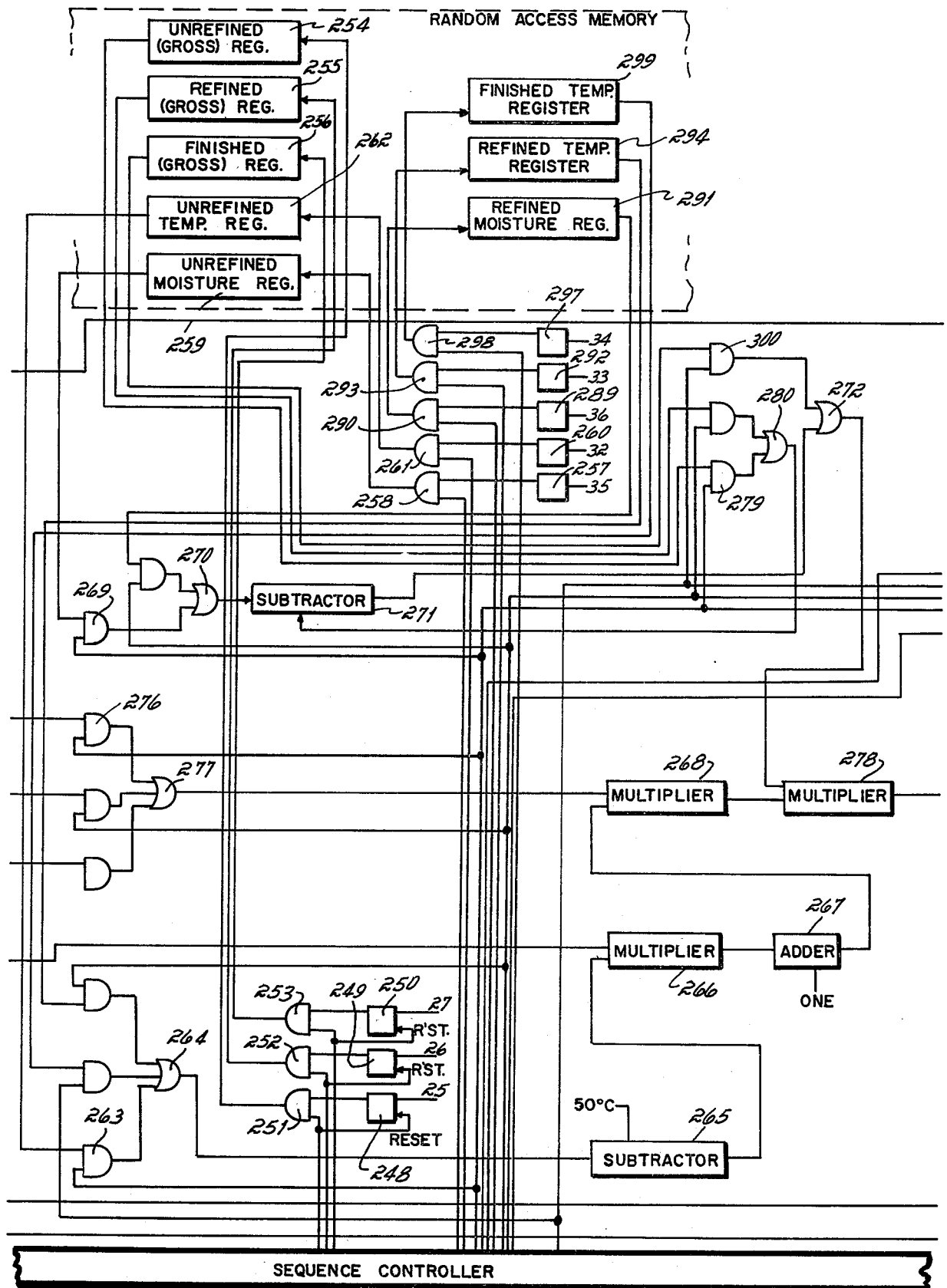

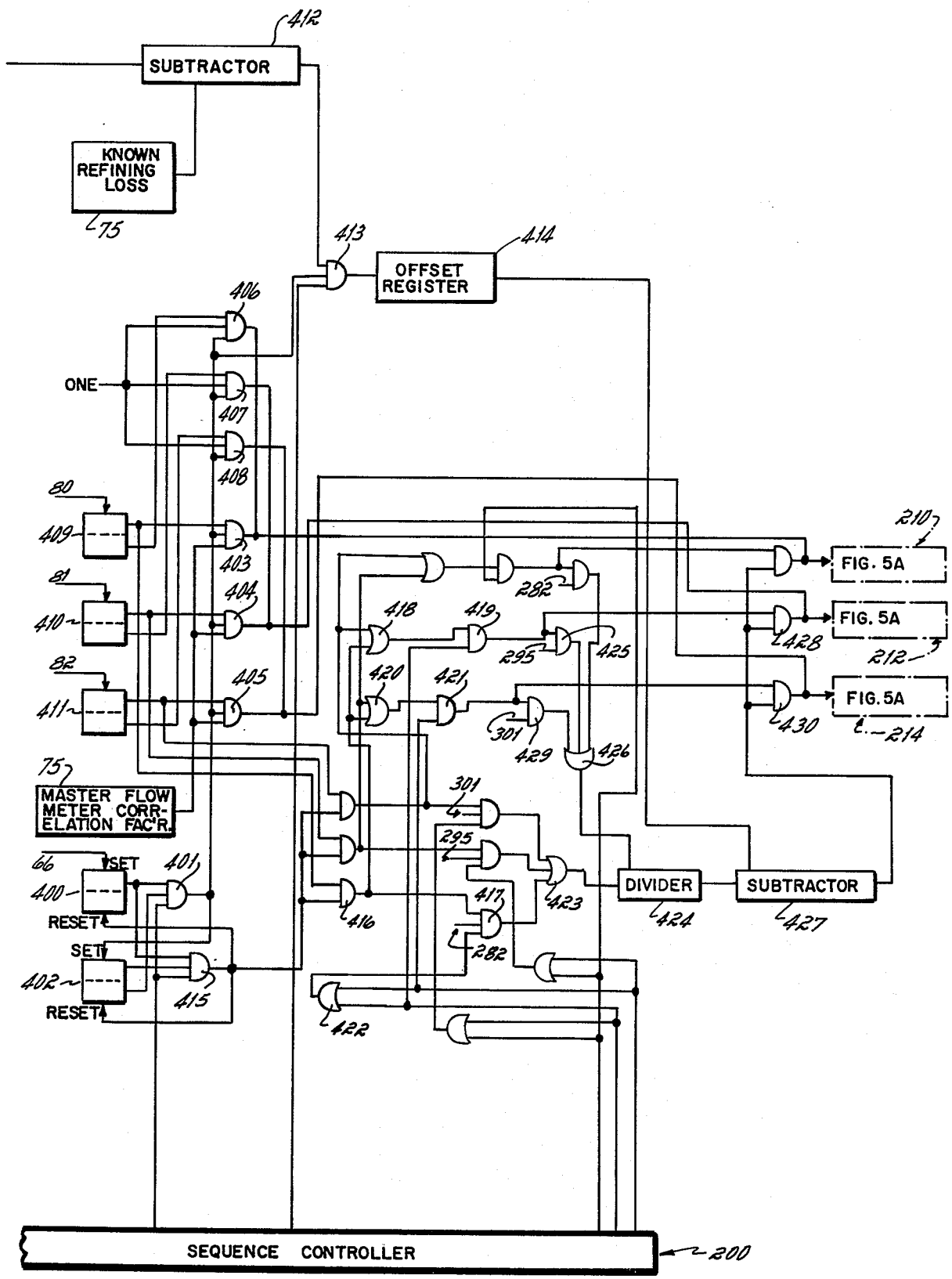

REFINERY AND PIPELINE MONITORING SYSTEM

BACKGROUND OF THE INVENTION

The present invention relates to apparatus and methods which provide data by which personnel can monitor the operation of a fluid flow system.

Leakage of fluid from a fluid flow system for toxic, corrosive, or flammable chemicals poses a potential safety hazard for employees of an industrial plant and inhabitants of the surrounding community. Leakage from a fluid flow system, such as a pipeline for transportation of crude oil from offshore to onshore stations, poses a risk of damage to the environment. Leakage during transportation of fuel in a pipeline results in diminution of the available supply of fuel and adds to the energy crisis. In the interests of safety, ecology, and energy conservation, operation of fluid flow systems must be monitored so that prompt corrective action can be taken in the event of loss due to leakage.

Unnecessary refining loss is a major concern of industry. Production control personnel must know the refining loss in order to adjust operation of the refining process to improve efficiency and to reduce refining loss to an optimum figure. In the interest of efficiency, refining processes must be monitored so tht prompt corrective action can be taken to minimize loss due to refining.

Moreover, if loss due to leakage or refining is minimized, waste of significant dollar amounts of material is avoided.

In all fluid flow systems operation can be monitored by comparing the amount of fluid that is input to the fluid flow system with the amount of fluid that is output from the fluid flow system. If more fluid flows in than out, the occurrence a of loss is indicated. If more fluid flows out than in, the occurrence of a gain is indicated. Actually, "gain" is negative loss and is hereinafter included within the meaning of the term "loss" unless it is expressly stated otherwise.

For many years leakage detection systems employed instantaneous flow measurements at spaced stations along a pipeline and determined the difference between these instantaneous measurements to obtain an indication of loss between any two locations monitored. By instantaneous measurement is meant a measurement of a characteristic of the fluid flow system, such as fluid flow, at a particular moment of time. Such leakage detection systems assumed a hydraulic stability that cannot and does not occur in practice. Thus, sudden disturbances in the operation of the fluid flow system resulted in erroneous loss indications.

In an attempt to improve upon such leakage detection systems, the monitoring system of Fowler et al. U.S. Pat. No. 3,505,513 totals the fluid that flows through remote stations at various locations along a pipeline over an interval of time. Upon interrogation from a master station at the end of the time interval each remote station transmits its total to the master station. The master station calculates the difference between totals at successive stations. The calculation is compared to a preset limit to obtain an indication of loss due to leakage.

The system of Fowler et al. provides an intermittent loss for the pipeline since the calculation is based on totals for an interval of operation rather than instantaneous measurements. Fowler et al. recognizes the fact that noise or sudden disturbances, such as sharp pressure or temperature changes, which occur during an interval of operation, can cause a spurious loss indication, especially where the monitoring system is set to detect a small leak. Fowler et al. proposes that a counter be employed so that the monitoring system responds only to a predetermined number of consecutive intermittent loss calculations.

Erroneous loss indications can, however, result unless the minimum number of consecutive intermittent loss calculations cannot occur during a period of time less than the stabilization time for the pipeline. If the stabilization time is taken into account, however, a large amount of fluid can be lost before personnel take corrective action since no alarm due to an actual change in the operation of the pipeline results for a predetermined number of consecutive intervals of operation of the pipeline.

The monitoring system of Sullivan U.S. Pat. No. 3,909,596 employs stations at various locations in a refinery which generate counts which are temperature compensated and which may be moisture compensated based on laboratory analysis. After one of the stations reaches a predetermined count, it enables a difference counter. The difference counter counts simultaneously with the second station until the second station reaches the predetermined number of counts. The difference count is displayed as an indication of loss due to refining.

The monitoring system of Sullivan provides intermittent loss for a refining process, analogous to the intermittent loss for a pipeline by Fowler et al., since each difference count relates to an interval of operation. Sullivan recognizes the fact that noise or sudden disturbances, such as sharp pressure changes, may cause a spurious loss indication. Sullivan proposes that the counters at the stations count predetermined ones of the signals generated by the stations to increase the period of time which is required to arrive at the difference count beyond the stabilization time of the refining process.

Since sudden disturbances during an interval of operation influence the loss for only that interval of operation, however, the indication of loss for the interval of operation can appear unreasonably high. Although the fluid flow system might actually have stabilized, personnel may react unnecessarily to the high loss indication to adjust operation of the refining process since in the event operation has not stabilized hesitation would result in waste of material.

It is an object of the present invention to provide apparatus and methods which generate a series of intermittent losses in which each element of the series is determined on the basis of data for more than a single interval of operation, thereby eliminating spurious indications of loss due to sudden disturbances in the operation of the fluid flow system.

It is an associated object of the present invention to smooth sudden disturbances in the operation of the fluid flow system over a selectively variable number of intermittent loss indications in the series.

It is also an associated object of the present invention to provide apparatus and methods to average changes in the operation of the fluid flow system over a selectively variable number of intermittent loss indications in the series for the purpose of displaying trends in the operation of the fluid flow system.

It is another object of the present invention to provide apparatus and methods which, in addition to generating a series of intermittent losses, generate an accurate overall loss for the duration of operation of the fluid flow system.

It is an additional object of the present invention to provide apparatus and methods to correct fluid flow meter measurements to a standard temperature, moisture content, and flow meter calibration to assure the reliability of both the intermittent and overall loss indications.

Among the other objects of the present invention is to provide apparatus and methods to calibrate the fluid flow meters during actual operation of the fluid flow system.

SUMMARY OF THE INVENTION

The above and other objects are attained in accordance with the present invention which provides in a preferred embodiment an improved monitoring system that computes a series of intermittent losses based on a) the cumulative net amount of fluid which has flowed through one station along a fluid flow system, b) the cumulative net amount of fluid which has flowed through another station along the fluid flow system, and c) a selectively variable number which is used as a smoothing or averaging factor. The net amount of fluid which flows through each station during an interval of operation of the fluid flow system comprises a measurement by a flow meter at the station which the monitoring system then corrects to standard temperature, moisture content, and for station flow meter calibration. The net fluid amounts for each station are used to increment running totals, or cumulative net amounts, of fluid for each station. The selectively variable number is selected by personnel monitoring the fluid flow system. This number, for example, forty, defines a series which comprises a number of intermittent loss indications over which a) any sudden disturbances in the operation of the fluid flow system are smoothed in order to eliminate a spurious loss indication for an interval of operation and b) any changes in the operation of the fluid flow system are averaged in order to display a trend for more reliable monitoring of the fluid flow system. As desired, of course, the selectively variable number may be set at one. Although the number selected may be one, however, some smoothing of sudden disturbances and averaging of changes in the operation results since cumulative net amounts of fluid are used to determine the series of intermittent losses.

Since the series of intermittent losses of the fluid flow system is correlated to cumulative net fluid amounts and a smoothing or averaging factor, the preferred embodiment of the present invention has the distinct advantage of de-emphasizing sudden disturbances during an interval of operation of the fluid flow system being monitored. Changes in operation of the fluid flow system being monitored appear as a trend. Furthermore, the preferred embodiment of the present invention has the significant advantage of requiring a minimum of memory to determine a series of intermittent losses.

In a second embodiment of the monitoring system of the present invention a selectively variable number of samples is selected by personnel monitoring the fluid flow system. Each sample corresponds to the net amount of fluid for a station for one interval of operation of the fluid flow system. After the preselected number of samples for each station has been stored, the samples are continually updated by replacing the oldest sample with a new sample for the most recent interval of operation. The monitoring system sums the samples for each station to calculate a cumulative net amount of fluid for that station. The series of intermittent losses is correlated to these cumulative net amounts of fluid and the number of samples selected. If the number of samples selected is greater than one, smoothing of sudden disturbances and averaging of changes in operation results since a sum of net amounts of fluid for more than one interval of operation of the fluid flow system is used to determine the series of intermittent losses. The second embodiment of the present invention does not have the advantage of requiring a minimum of memory to determine a series of intermittent losses since a preselected number or registers is required to store samples for each station.

The system of the present invention also provides computation of an overall loss using the total net amounts of fluid input to and output from a fluid flow system during the duration of its operation. The overall loss is determined by computing the difference between the total of net amounts of fluid input to and output from the fluid flow system. The difference may be divided by the total of net amounts of fluid input to the fluid flow system, thereby generating an overall loss as a percentage of the total of net amounts of fluid input to the fluid flow system. The overall loss represents the loss between input and output stations rather than the loss between any two stations which is represented by the series of intermittent losses. The overall loss relates to a period of operation of the fluid flow system generally longer than the sum of the intervals of operation to which the series of intermittent losses relates. The overall loss enables an accountant or engineering department to analyze long-term operation of the fluid flow system whereas the series of intermittent losses is intended to enable personnel to supervise short-term operation of the fluid flow system and repair or adjust operation of the fluid flow system if necessary. In accordance with the present invention, the overall loss computation is triggered by a fluid level or pressure transducer located at a point along the fluid flow system. A time delay may also be incorporated to provide a selectively variable minimum time interval between any two overall loss computations.

The system of the present invention also provides correlation among fluid flow meters at the station during actual operation of the fluid flow system. After the operator selects a particular station as the master, the present invention automatically adjusts the net amounts of fluid for the other stations to produce a zero loss indication. If it is actually known that loss is present, the present invention permits personnel to enter the actual loss, and flow meter correlation during operation of the fluid flow system is adjusted automatically to account for the entered loss. Personnel may also calibrate the flow meters during operation of the fluid flow system.

Other objects and advantages of the monitoring system of the present invention will become clear from a consideration of the drawing in connection with the general and detailed descriptions.

BRIEF DESCRIPTION OF THE DRAWINGS

In the drawings:

FIG. 3 is a front elevational view of a panel associated with the monitoring system of the present invention.

FIG. 7 is a graph of several series of intermittent losses, including series of intermittent losses determined both in accordance with the prior art and in accordance with the present invention, shown in Table I.

GENERAL DESCRIPTION OF SYSTEM AND OPERATION

Figure 1:
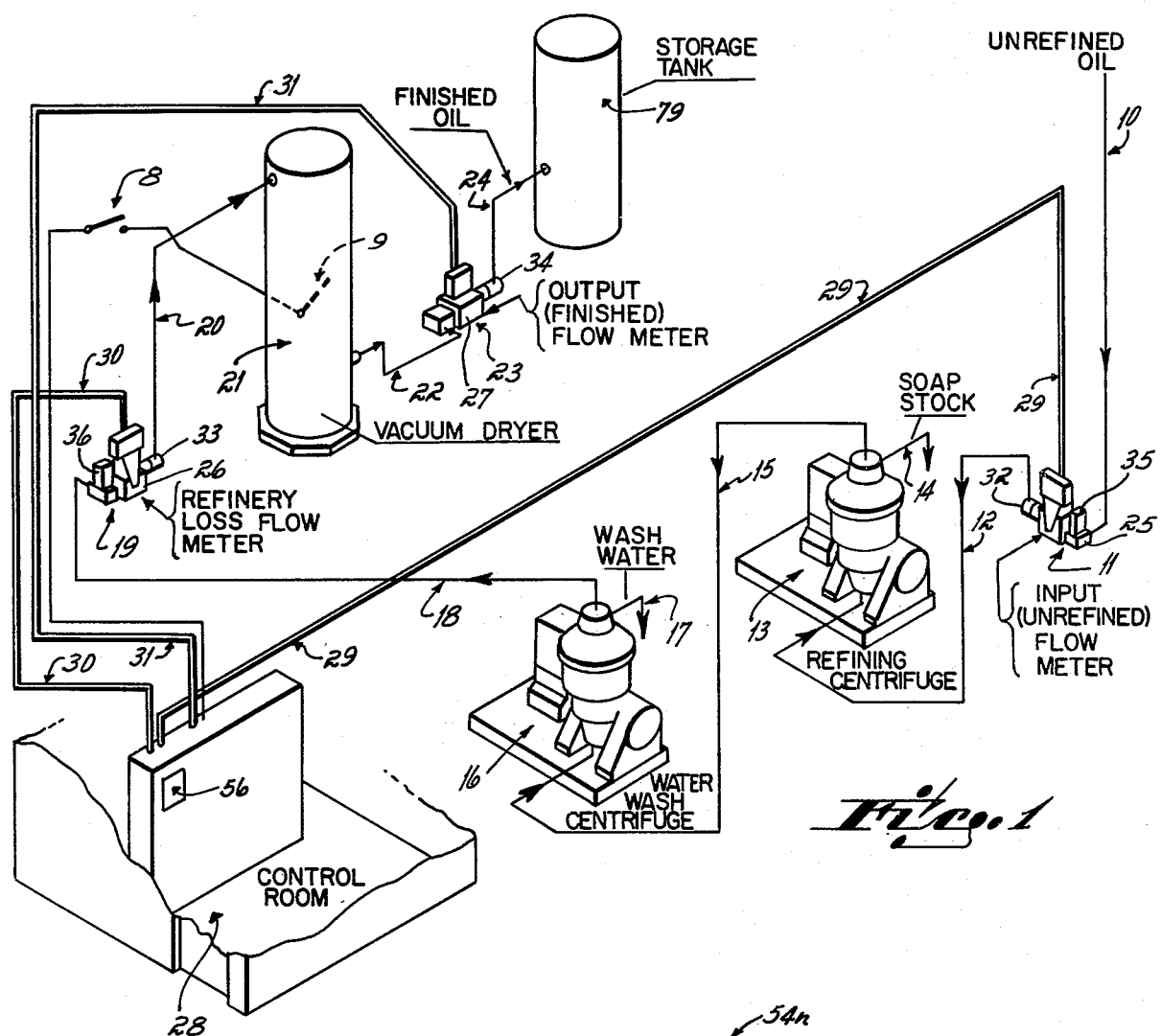
FIG. 1 is a diagrammatic representation of a vegetable oil refinery employing a monitoring system incorporating the features of the present invention.

The monitoring system of the present invention will be described in connection with a reresentative refining process such as the vegetable oil refinery depicted in the diagrammatic representation of FIG. 1. As shown in FIG. 1, unrefined vegetable oil from a storage tank (not shown) is input to pipe 10 and is fed according to the present invention through input flow meter 11, which measures the unrefined oil input to the vegetable oil refinery. Pipe 12 connects input flow meter 111 (usually via a heater, not shown) to refining centrifuge 13 in which the unrefined oil is subjected to lye and from which soap stock is withdrawn through pipe 14. The oil flows from refining centrifuge 13 through pipe 15 (usually via another heater, not shown) to water wash centrifuge 16 in which heated water is used to wash out remaining lye and from which wash water is withdrawn through pipe 17. Refined oil flows from water wash centrifuge 16 through pipe 18 and is fed according to the present invention through refinery loss flow meter 19, which measures the output of oil from the refining process. Pipe 20 connects refinery loss flow meter 19 to vacuum dryer 21 which removes excess water from the refined oil. Finished oil flows from vacuum dryer 21 through pipe 22 and is fed according to the present invention through output flow meter 23, which measures the output of finished oil from the vegetable oil refinery before it enters storage tank 79 via pipe 24.

Input flow meter 11, refinery loss flow meter 19, and output flow meter 23 may each comprise a positive displacement flow meter which has at least one rotor. The rotors of input flow meter 11, refinery loss flow meter 19, and output flow meter 23 are connected to high frequency pulse generators 25, 26, and 27, respectively.

Pulse generators 25, 26, and 27 may each comprise a high frequency pulse generator disclosed in Rockwell Manufacturing Company Technical Data: S 351-10C. The rotor of each flow meter 11, 19, or 23 rotates directly or indirectly a shaft of the pulse generator 25, 26, or 27 associated therewith. Each shaft rotates a disc with precisely spaced opaque and transparent slots between an incandescent lamp and a photo-voltaic cell. The rapid interruption of the light source causes the photocell to emit pulses into a self-contained transistorized circuit for shaping and amplifying. Each resulting pulse from pulse generator 25, 26, or 27 is a positive square wave. The number of pulses generated by pulse generators 25, 26, and 27 depends upon the amount of oil which flows through flow meters 11, 19, and 23, respectively. The outputs of pulse generators 25, 26, and 27 are connected to control room 28 via multiple conductor cables 29, 30, and 31, respectively.

Temperature transducers 32, 33, and 34, such as thermocouples, measure the fluid temperature flowing through flow meters 11, 19, and 23, respectively. Thus, the temperature of unrefined oil flowing through input flow meter 11 is measured by temperature transducer 32, the temperature of refined oil flowing through refinery loss flow meter 19 is measured by temperature transducer 33, and the temperature of finished oil flowing through output flow meter 23 is measured by temperature transducer 34. The outputs of temperature transducers 32, 33, and 34 are connected to control room 28 via multiple conductor cables 29, 30, and 31, respectively.

The monitoring system of the present invention preferably employs moisture content transducers 35 and 36 at the input flow meter 11 and refinery loss flow meter 19 locations, respectively. Moisture content transducers 35 and 36 may each comprise apparatus such as Ennis et al. U.S. Pat. No. 2,617,299 discloses for determining the moisture content of oil based on the dielectric constant of fluid. The outputs of moisture content transducers 35 and 36 are connected to control room 28 via multiple conductor cables 29 and 30, respectively.

The outputs from pulse generators 25, 26, and 27, the analog outputs of temperature transducers 32, 33, and 34, and the analog outputs of moisture content transducers 35 and 36, which are connected to control room 28 via multiple conductor cables 29, 30, and 31, supply the data which is necessary to perform computations which are displayed to facilitate monitoring of the vegetable oil refinery. This data is input to computer and display means which are associated with panel 56 of FIG. 3.

Fluctuation of the fluid level in vacuum dryer 21 poses a potential source of error when determining overall loss, which is refining process loss plus vacuum drying, or finishing, loss. If the overall loss is determined over an interval of operation without regard to the fluid level in vacuum dryer 21, an overall change in the level of fluid in vacuum dryer 21 over the interval of operation would affect overall loss; that is, an overall increase in the level of fluid in vacuum dryer 21 during the interval of operation would result in an erroneously high overall loss and an overall decrease in the level of fluid in vacuum dryer 21 during the interval of operation would result in an erroneously low overall loss. To facilitate accurate determination of loss in the refining process plus losses attributable to removal of water, entrained and dissolved air, and volatiles in the fluid as well as fluid vapor loss in vacuum dryer 21, level indicator switch 9 is mounted in vacuum dryer 21 and generates a signal when the fluid in vacuum dryer 21 is at a predetermined level. Level indicator switch 9 is connected to control room 28 via level indicator on/off switch 8. The overall loss can thus be determined for an interval of operation between identical level conditions in vacuum dryer 21, and error in overall loss due to overall change in the fluid level in vacuum dryer 21 is eliminated.

Figure 2:
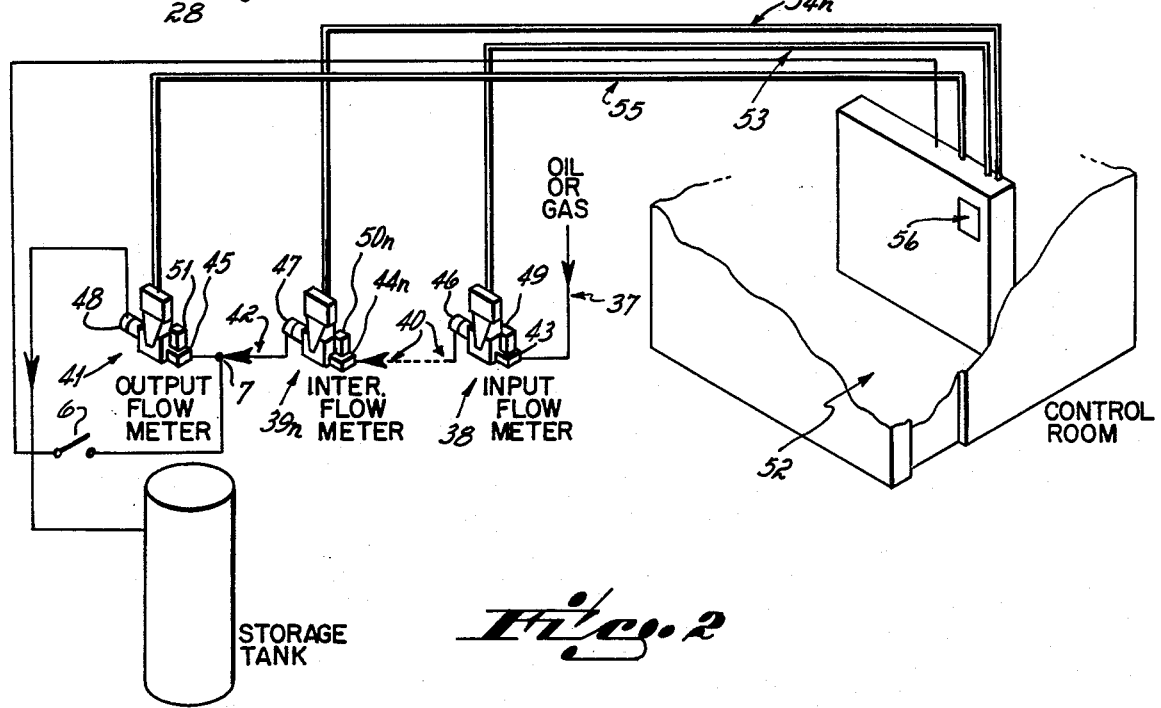
FIG. 2 is a diagrammatic representation of a fuel pipeline employing a monitoring system incorporating the features of the present invention.

Referring to FIG. 2, it should be noted that the monitoring system of the present invention also has application in the area of pipeline leakage detection and in determining the particular section of pipeline that contains a leak. As shown in FIG. 2, fuel is input to pipe 37 and is fed through input flow meter 38, which measures fuel input to the pipeline. Input flow meter 38 is connected to at least one intermediate flow meter $39_n$ via pipe 40. Intermediate flow meter $39_n$ is connected to output flow meter 41 via pipe 42. Input flow meter 38, intermediate flow meter $39_n$, and output flow meter 41 have associated therewith pulse generators 43, $44_n$, and 45; temperature transducers 46, 47, and 48; and moisture content transducers 49, $50_n$, and 51 which are connected to control room 52 via multiple conductor cables 53, $54_n$, and 55, respectively. The data from the various transducers is input to computer and display means which are associated with panel 56 of FIG. 3. On the basis of computations using the data, the monitoring system of the present invention is able to determine not only that there is a leakage condition, but also that the leakage condition is present in a length of pipeline between certain flow meters. In order to facilitate accurate determination of overall loss, pressure indicator switch 7 is mounted between the last intermediate flow meter $39_n$ and output flow meter 41. Pressure indicator switch 7 is connected to control room 52 via pressure indicator on/off switch 6. Determination of overall loss for an interval of pipeline operation between identical pressure conditions is analogous to determination of overall loss for an interval of refinery operation between identical level conditions.

In most respects the monitoring system employed in the pipeline of FIG. 2 is analogous to the monitoring system employed in the vegetable oil refinery of FIG. 1. Thus, except where necessary to point out distinctions between application of the monitoring system of the present invention to pipeline leakage detection and its application to refinery monitoring, discussion of pipeline leakage detection will not be considered in detail below.

FIG. 3 depicts panel 56 which is associated with the arithmetic and logic circuitry which performs and displays the computations which will be described in detail below. Panel 56 includes sample number selector 57. Sample number selector 57 comprises, for example, two rotary decade switches which an operator uses to select the number of computations or statistical samples for the smoothing and trend technique for the series of intermittent losses which will be described in detail below. Each intermittent loss which is computed is displayed in LED display 58.

The series of intermittent losses is also charted by strip chart recorder 59. Strip chart recorder 59 charts each intermittent loss over a narrow plus or minus 1% span about a center loss percentage value selected by the operator using trend zero selector 60. For example, with trend zero selector 60 set to 2% the strip chart record span is 1% to 3%. Trend zero selector 60 comprises two rotary decade switches. The operator sets trend zero selector 60 to the nearest whole number percentage value of the loss and writes the number indicated by trend zero selector 60 on the face of the strip chart record. The operator adds the number which he writes on the strip chart record to the reading on the strip chart record to determine the actual percentage intermittent loss. By use of trend zero selector 60 errors due to hysteresis in the strip chart recorder mechanism are reduced and very small changes in the trend of the series of intermittent losses can be easily detected by the operator.

Panel 56 includes a set of push button data switches 61. The operator can depress one of data switches 61 to display a parameter associated with the vegetable oil refinery being monitored. Each of data switches 61 is actually associated with two parameters. The operator uses display select switch 62 to determine which of the parameters is displayed. Data for a parameter is input to panel 56 from a location in the refinery by a conventional transducer. Data switches 61 permit display of flow rates for various material added to the refining process, volumes of material entered into the refining process during operation, temperatures, pressures, moisture contents, etc. The data for the selected parameter is displayed in a second LED display 63.

Panel 56 includes on/off switch 68 and a set of function selectors 64 which the operator uses to determine the mode of operation for (a) the arithmetic and logic circuitry and (b) printer 65. Modes of operation for the arithmetic and logic circuitry include prove and test modes which the operator selects with push button switches 66 and 67, respectively. These modes of operation will be described in detail below. The printer controls include a set of three automatic print interval switches 78 by which the operator selects a six, thirty, or sixty minute interval for data printout and feed switch 69 for use in loading paper into printer 65. Other printer controls include manual printout command switch 70, reset printout command switch 71, and overall loss printout command switch 72, whose purpose will be described below.

Panel 56 includes key-operated data entry switch 73. Data entry switch 73 enables push button data input switch 76. Data input switch 76 is used by the operator to input data which he enters in manual data entry registers 75. Data entry switch 73, data input switch 76, and manual data entry registers 75 permit the operator to input data which the monitoring system requires for initialization, such as time of day. Manual data entry registers 75 also enhance flexibility of the monitoring system of the present invention by facilitating entry of known loss data. This feature will be described in more detail below.

Referring to FIGS. 1 and 3, when the operator activates the monitoring system of the present invention using on/off switch 68, the monitoring system commences an initialization phase. During the initialization phase, all registers in a random access memory are reset, the time of day which is entered by the operator using data entry switch 73, data input switch 76, and manual data entry registers 75 is read, and various factors are read from a read only memory. The factors from the read only memory are those which the monitoring system uses to compute net amounts of fluid in the absence of data entered by the operator using data entry switch 73, data input switch 76, and manual data entry registers 75 or computed during a "prove" which will be described below. When the monitoring system has been initialized, printer 65 prints the message "up".

The arithmetic and logic circuitry then cycles through a series of steps to determine losses and displays and/or prints the losses. It also displays and/or prints parameters related to operation of the refinery being monitored. The information which is output is used by the operator to make adjustments in the operation of the refining process. In general, the logic circuitry controls arithmetic computations by the arithmetic circuitry.

The monitoring system continuously updates the time of day which is read during the initialization phase. On the basis of elapsed time from initialization the monitoring system performs certain computations and output functions. Thus, for example, data is printed out at only certain intervals of time in accordance with printout interval switches 78.

During each cycle the monitoring system reads counters which are controlled by signals from pulse generators 25, 26, and 27 and then resets the counters. The monitoring system also receives signals from analog to digital (A/D) converters which are associated with temperature transducers 32, 33, and 34 and moisture content transducers 35 and 36. The arithmetic and logic circuitry then calculates the net amount of unrefined, refined, and finished fluid from the transducer data and flow meter correlation factors and the fluid coefficient of expansion read from read only memory. In the preferred embodiment, the net unrefined and refined fluid amounts are added to accumulating registers. The net unrefined and finished fluid amounts are added to totalizing registers. The net unrefined, refined, and finished fluid amounts are added to batch registers.

The monitoring system next determines wheter or not overall loss printout command switch 72 has been activated by the operator. If overall loss printout command switch 72 is activated, the monitoring system, subject to an indication from level indicator switch 9 and/or a time delay interval, determines the overall loss; that is, the total of net amounts of finished fluid in one totalizing register is subtracted from the total of net amounts of unrefined fluid in another totalizing register and the difference divided by the total of net amounts of unrefined fluid to determine the overall loss due to both the refining process and finishing process as a percentage of the total of net amounts of unrefined fluid input to the refinery. Thus, the system and method of the present invention provide for long-term, or overall, loss monitoring.

In order to provide short-term, or intermittent, loss monitoring to facilitate adjustment of parameters or other corrective measures, the monitoring system of the present invention also computes a loss which depends not upon the total of net unrefined and finished fluid amounts but rather upon cumulative net amounts of unrefined and refined fluid. The monitoring system accounts for a propagation interval by enabling the operator to enter a minimum, or threshold, amount for net unrefined fluid which must be exceeded before the monitoring system will compute an intermittent loss.

In the preferred embodiment after the threshold amount for net unrefined fluid has been exceeded, the arithmetic circuitry computes an intermittent loss based upon the cumulative net amount of refined fluid, the cumulative net amount of unrefined fluid, and a number of computations over which sudden disturbances in operation of the fluid flow system are to be averaged, which the operator selects using sample number selector 57.

According to another embodiment of the present invention a plurality of discrete net amounts of unrefined and refined fluid are used to compute an intermittent loss. The operator selects the number of discrete net amounts, or samples, which are employed to compute the intermittent loss using sample number selector 57. Sample number selector 57 determines the number of most recent discrete net amounts of unrefined and refined fluid that are stored. After the threshold amount of net unrefined fluid has been exceeded, the arithmetic circuitry computes an intermittent loss based upon the sum of net unrefined fluid samples, the sum of net refined fluid samples and the number of samples over which sudden disturbances in operation of the fluid flow system are to be smoothed or changes in operation of the fluid flow system are to be averaged, which the operator selects using sample number selector 57.

The advantages of these methods for arriving at the intermittent loss are numerous. Short-term instabilities in the refining process are damped in two ways. First, each time an intermittent loss computation is performed, the instantaneous loss at the point in time when the intermittent loss computation is performed is distributed over the number of computations or statistical samples selected by the operator using sample number selector 57. Secondly, rather than determine an instantaneous loss based solely on net amount of fluid for a single interval of operation, intermittent loss computations are based on cumulative net amounts of unrefined and refined fluid or a sum of net amounts of unrefined and refined fluid for several intervals of operation. Thus, surges and other variations in the amount of fluid processed during each interval of operation are effectively arranged over a number of such intervals. These methods of intermittent loss computation also provide on the record of strip chart recorder 59 a dramatic step-like display of a trend for a series of intermittent losses in the case of a change in operational status of the refinery. Moreover, the operator can select an automated printout by printer 65 at six, thirty, or sixty minute intervals using printout interval switches 78. Thus, the monitoring system can be made to print a record of operation.

The smoothing technique of the preferred embodiment has the concomitant advantage that, since cumulative net amounts rather than a plurality of discrete net amounts are used to compute a series of intermittent losses, the system and method of the present invention significantly reduce the size of random access memory. In some instances the smoothing technique of the preferred embodiment also reduces the number of arithmetic steps required to produce a series of intermittent losses.

The monitoring system also permits the operator to command a printout of loss and parameter data in several ways. If the operator depresses manual printout command switch 70, printer 65 prints data without affecting the cumulative net amounts of unrefined and refined fluid, the total of net amounts of unrefined and finished fluid, or the batch amounts of unrefined, refined, and finished fluid. If the operator desires to reset the monitoring system, for example, after he has altered a parameter, he depresses reset printout command switch 71. When reset printout command switch 71 is depressed, data is printed and the batch amounts of unrefined, refined, and finished fluid are reset to zero.

The flow meters which are employed in the monitoring system of the present invention may be initially calibrated in the method known in the prior art as a "prove". Basically, this method comprises bypassing refining process elements, for example, by directly connecting input flow meter 11, refinery loss flow meter 19, and output flow meter 23 using bypass pipe. By flowing a known amount of fluid through the bypass system, calibration factors may be computed for each of the flow meters which will adjust the metered amount of fluid to the known amount of fluid. This method of calibration, of course, requires bypass pipe making this method of calibration very expensive. Moreover, it is a time consuming and expensive proposition to recalibrate the system at any time after installation.

The monitoring system of the present invention provides for correlation of flow meters during actual operation of the refinery. The operator selects a prove mode by actuating prove selector 66. The operator also selects one of the three flow meters as master, or reference, flow meter and enters a master flow meter error, or correlation, factor. The monitoring system automatically computes a correlation factor for the two meters which are not selected as master and thereafter uses these factors in the net fluid amount computations.

In connection with the prove operation, the monitoring system of the present invention also provides for manual data entry of a known loss factor, or offset. For example, the operator may take samples of unrefined and refined fluid and perform laboratory analysis on the samples. On the basis of laboratory analysis, the refining loss may be precisely determined using prior art techniques. The operator may then enter the known refinery loss using data entry switch 73, data input switch 76, and manual data entry registers 75. The monitoring system of the present invention employs the entered known loss in computing the flow meter correction factors. Thus, the system flow meters may be calibrated without using bypass pipe to pass a known volume of fluid through each flow meter.

In order to increase the adaptability of the monitoring system of the present invention, as well as to facilitate corrections for replacement of equipment employed in the monitoring system, the operator may enter data using data entry switch 73, data input switch 76, and manual data entry registers 75. The operator may enter a different coefficient of expansion if a different fluid is refined or a different flow meter correlation factor if a flow meter is replaced. As described above, the system operates automatically to assume preset flow meter correction factors, coefficient of expansion, etc. Thus, the manual data entry capability enables the operator to update or override values employed by the monitoring system for performing net fluid amount computations.

DETAILED DESCRIPTION OF SYSTEM AND OPERATION

The system of the present invention will now be described in conjunction with the operational flow diagram of FIG. 4 and the schematic diagram of the arithmetic and logic circuitry of FIG. 5. Where it is necessary to a complete understanding, reference will also be made to FIG. 3.

The operator activates the monitoring system of the present invention by depressing on/off switch 68 in FIG. 3. Immediately after the monitoring system is activated, an initialization phase is commenced.

Figure 4A:
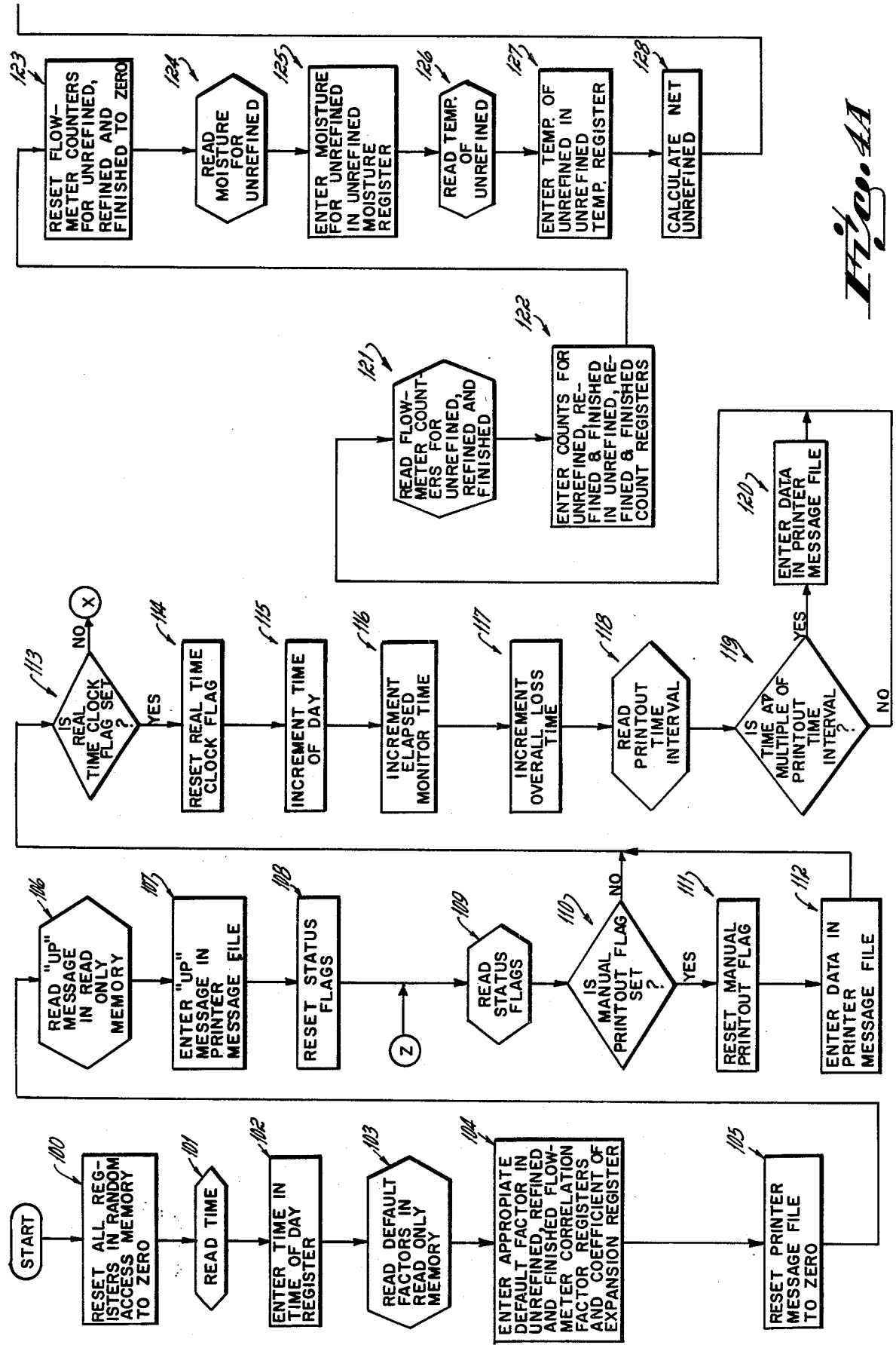
FIG. 4, including FIGS. 4A–4D connected as shown, is a flow diagram of the operation of the monitoring system of the present invention.

The registers in a random access memory are reset to zero as indicated by machine function 100 in FIG. 4A.

To effect entry of the time of day the operator enters the time of day by positioning display select switch 62 in FIG. 3 so that the upper display parameters are selected. He next operates data switch 77 in the set of data switches 61. The operator then enters the time of data in manual data entry registers 75. The operator enables data input key 76 by positioning data entry switch 73 to the enable position. Finally, the operator depresses data input key 76 to enter the time of day into the monitoring system. The monitoring system reads the time of day in manual data entry registers 75 as indicated by machine function 101 in FIG. 4A. The monitoring system enters the time of day in a register in random access memory as indicated by machine function 102.

Figure 4C:
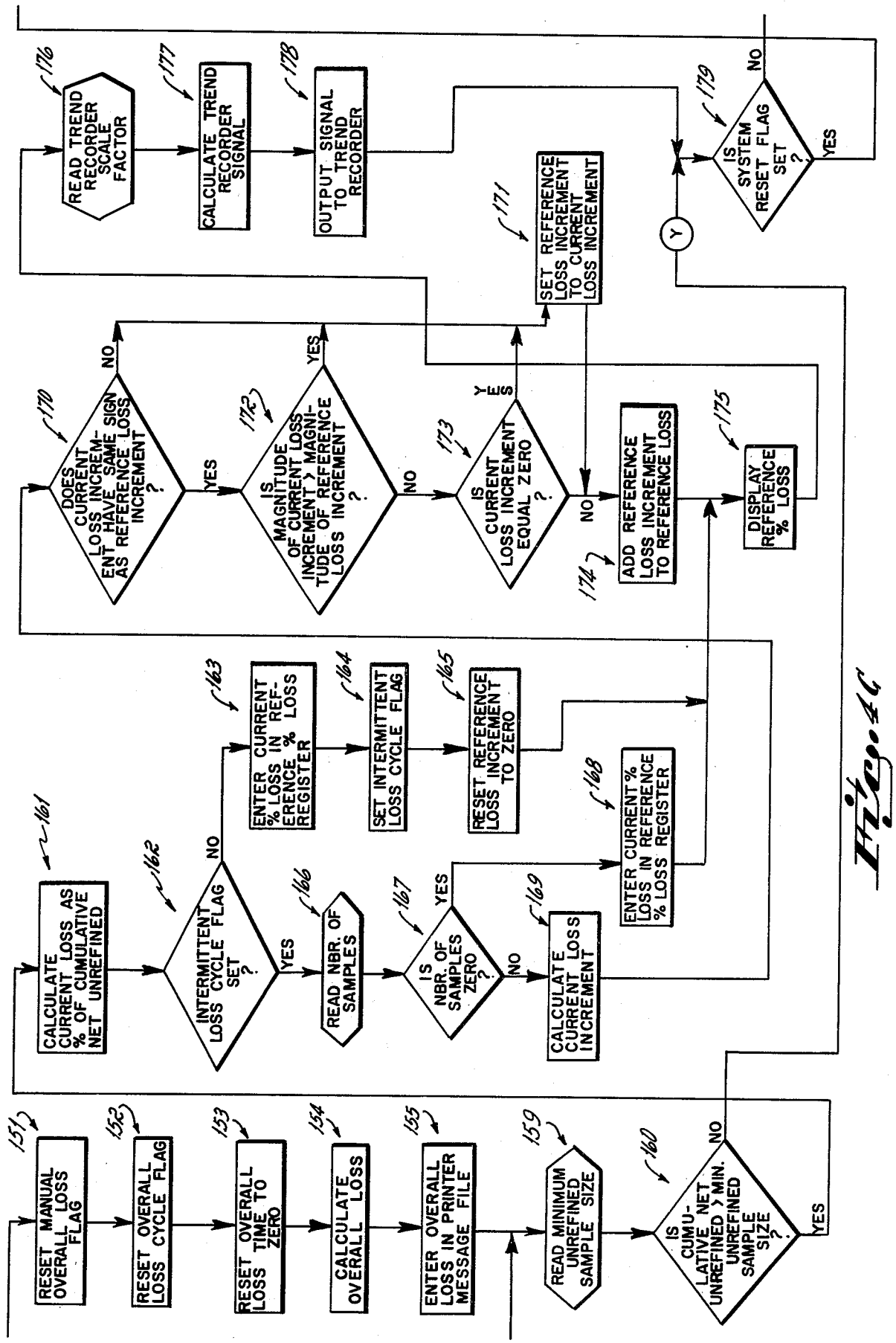
Figure 4D:
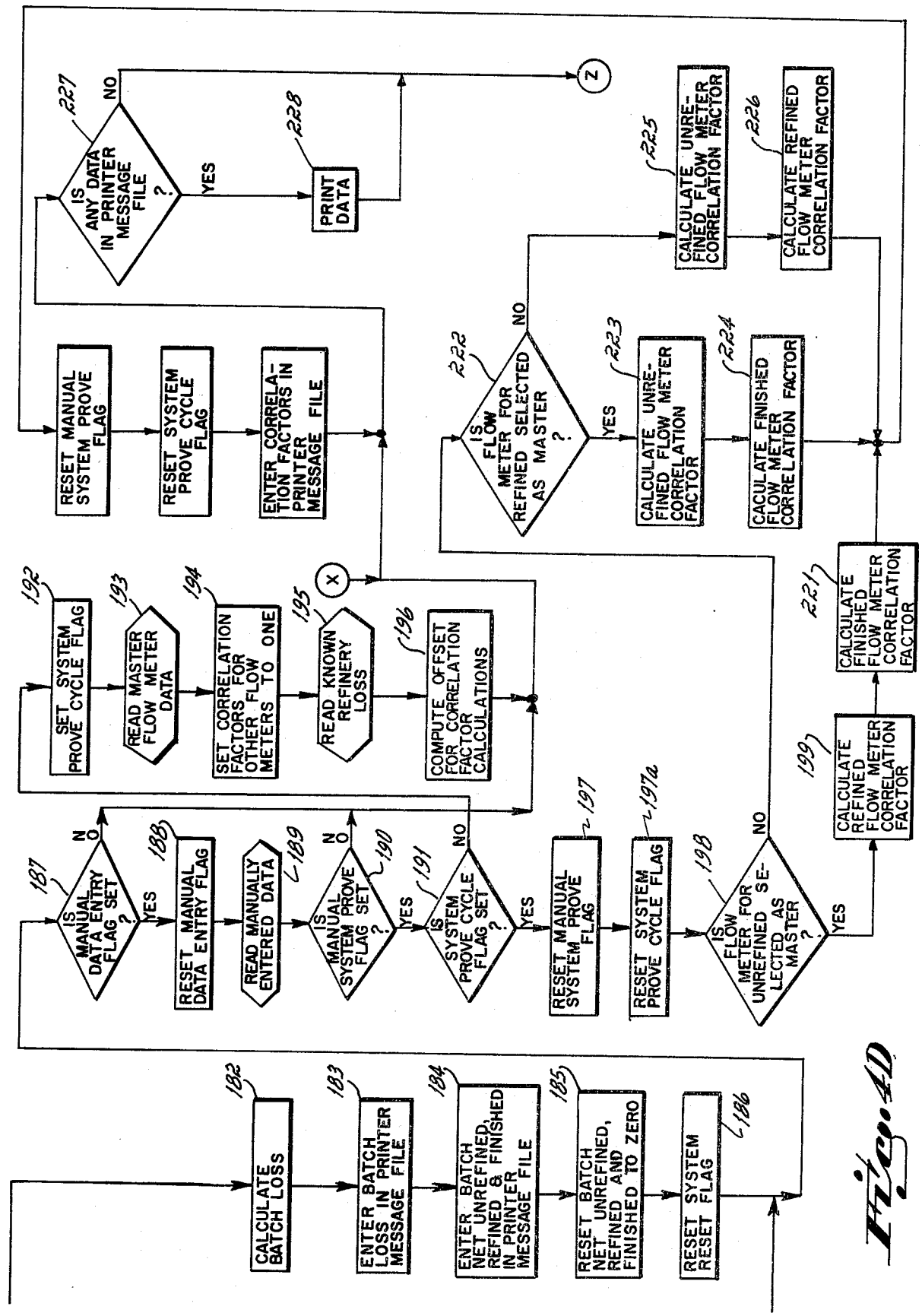
Figure 5A:
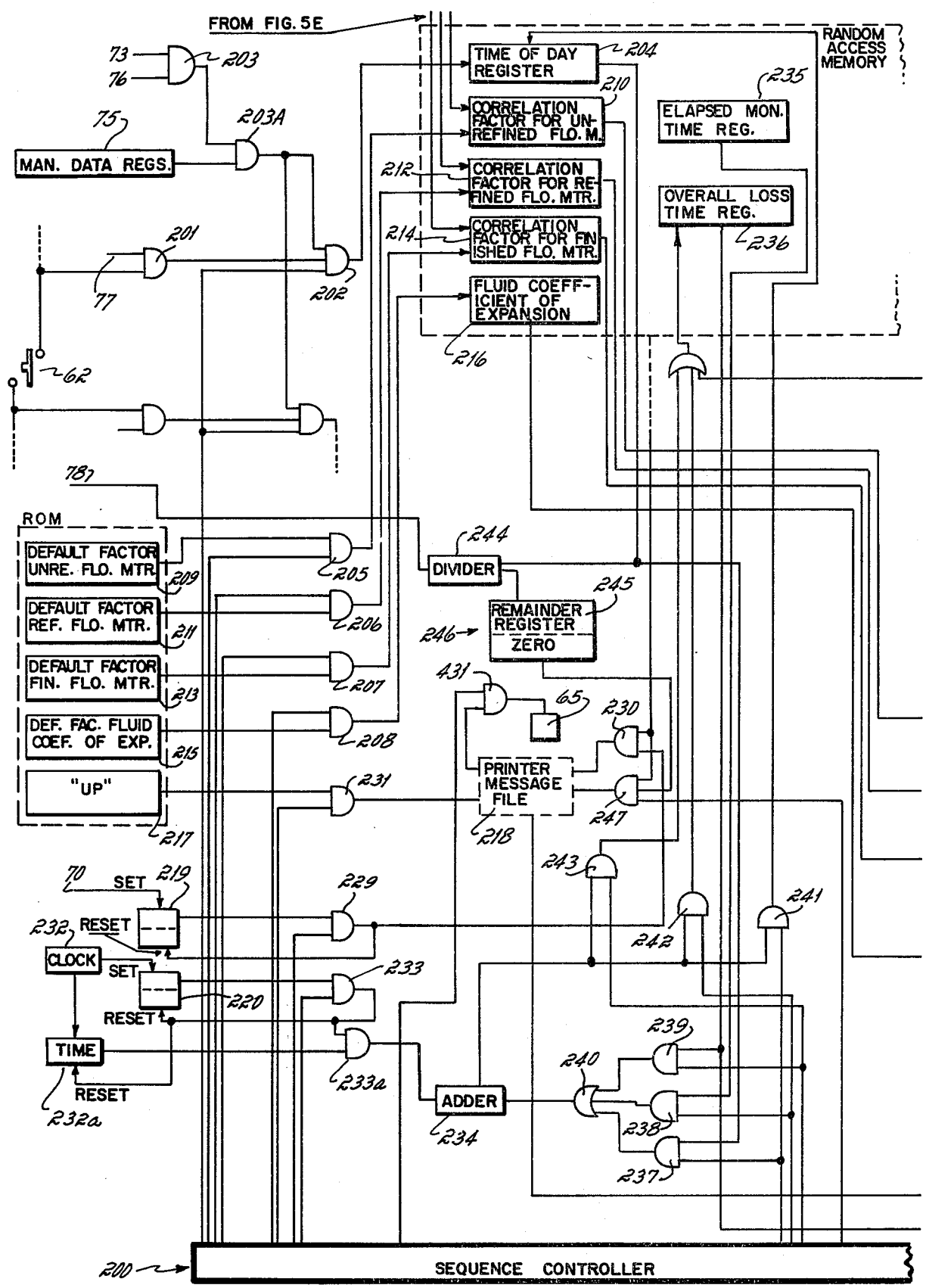
FIG. 5, including FIGS. 5A–5E connected as shown, is a schematic diagram of a preferred embodiment for a monitoring system in accordance with the present invention.
Figure 5G:
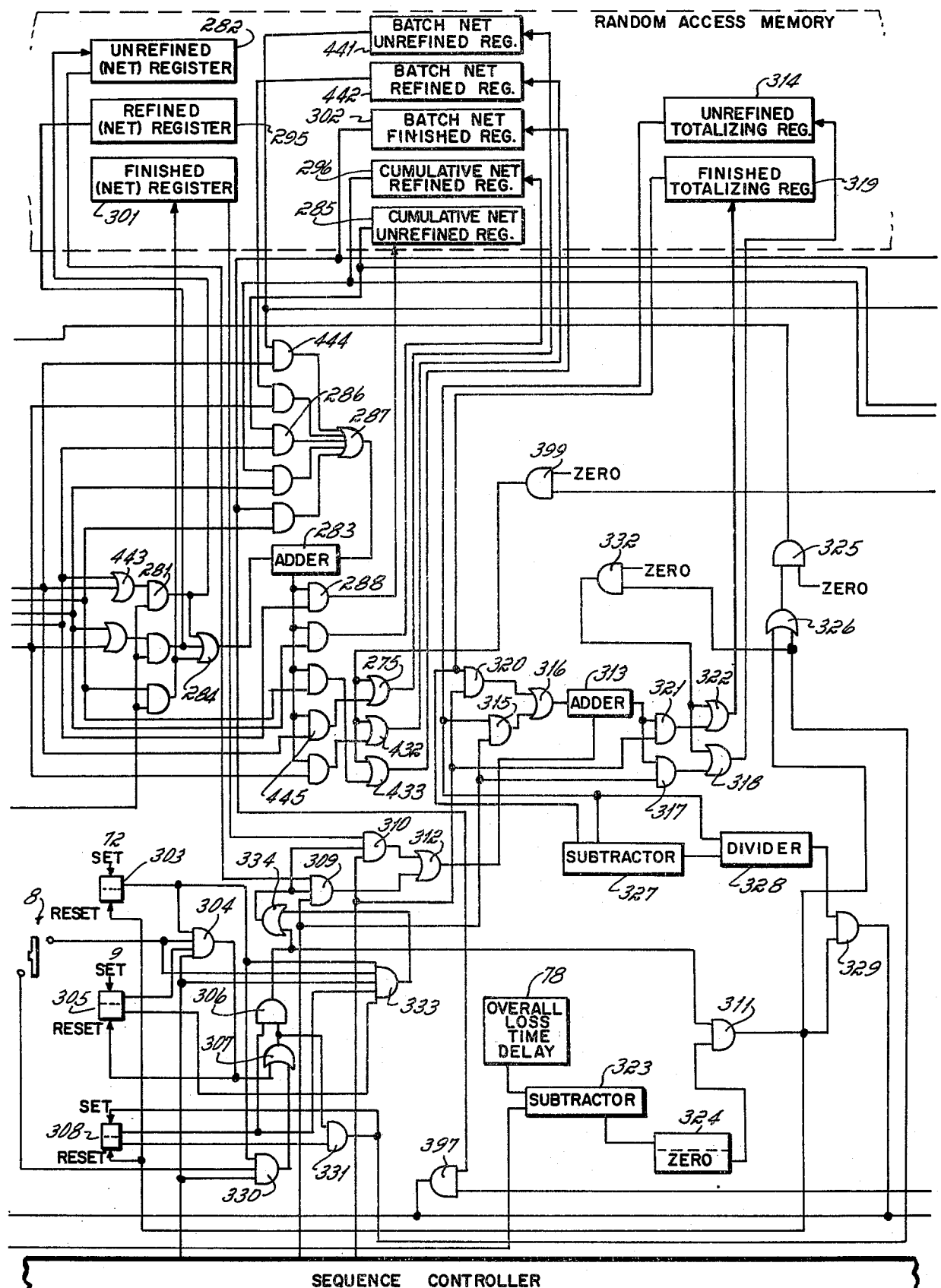
Figure 5D:
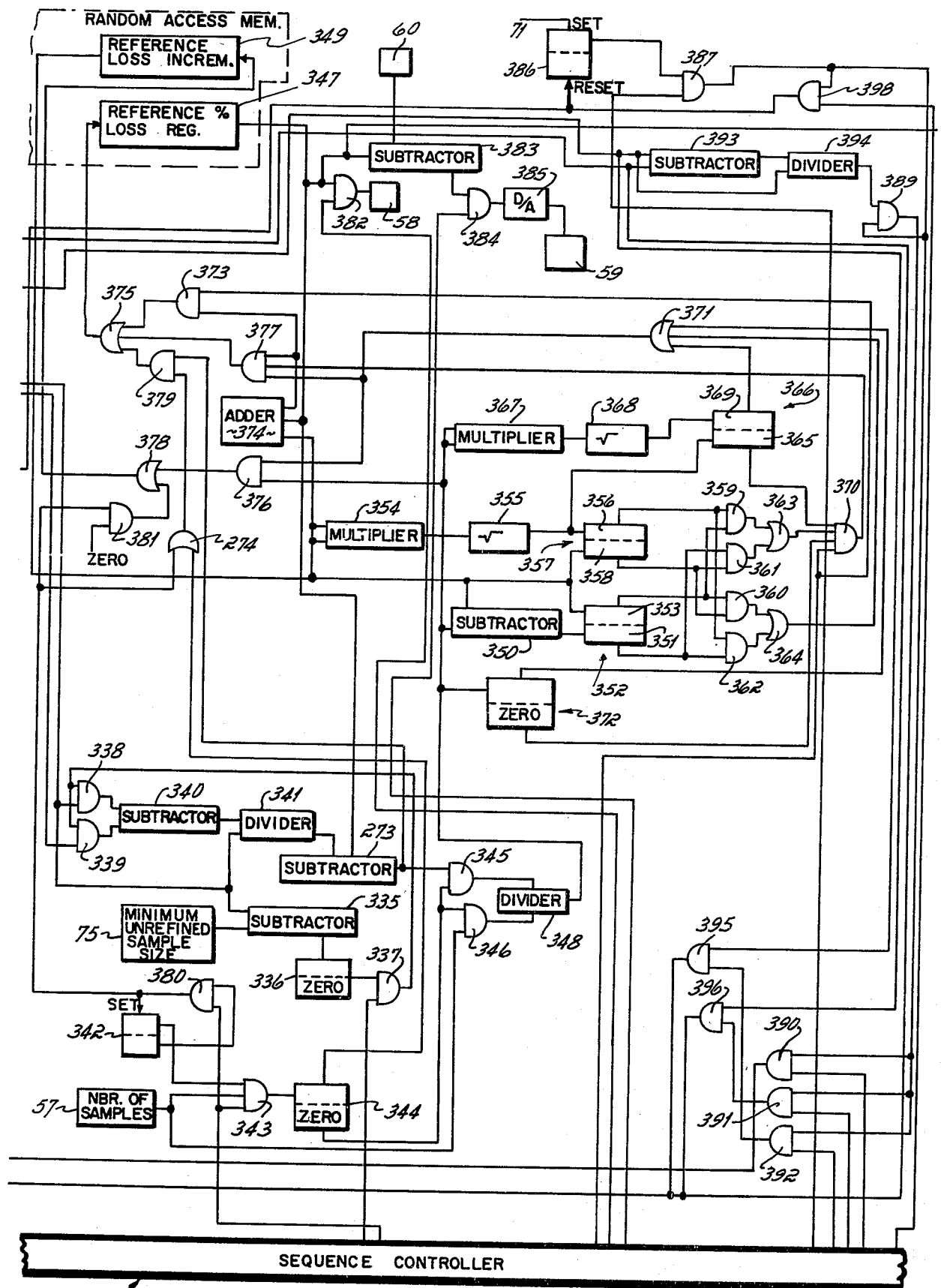
Figure 6G:
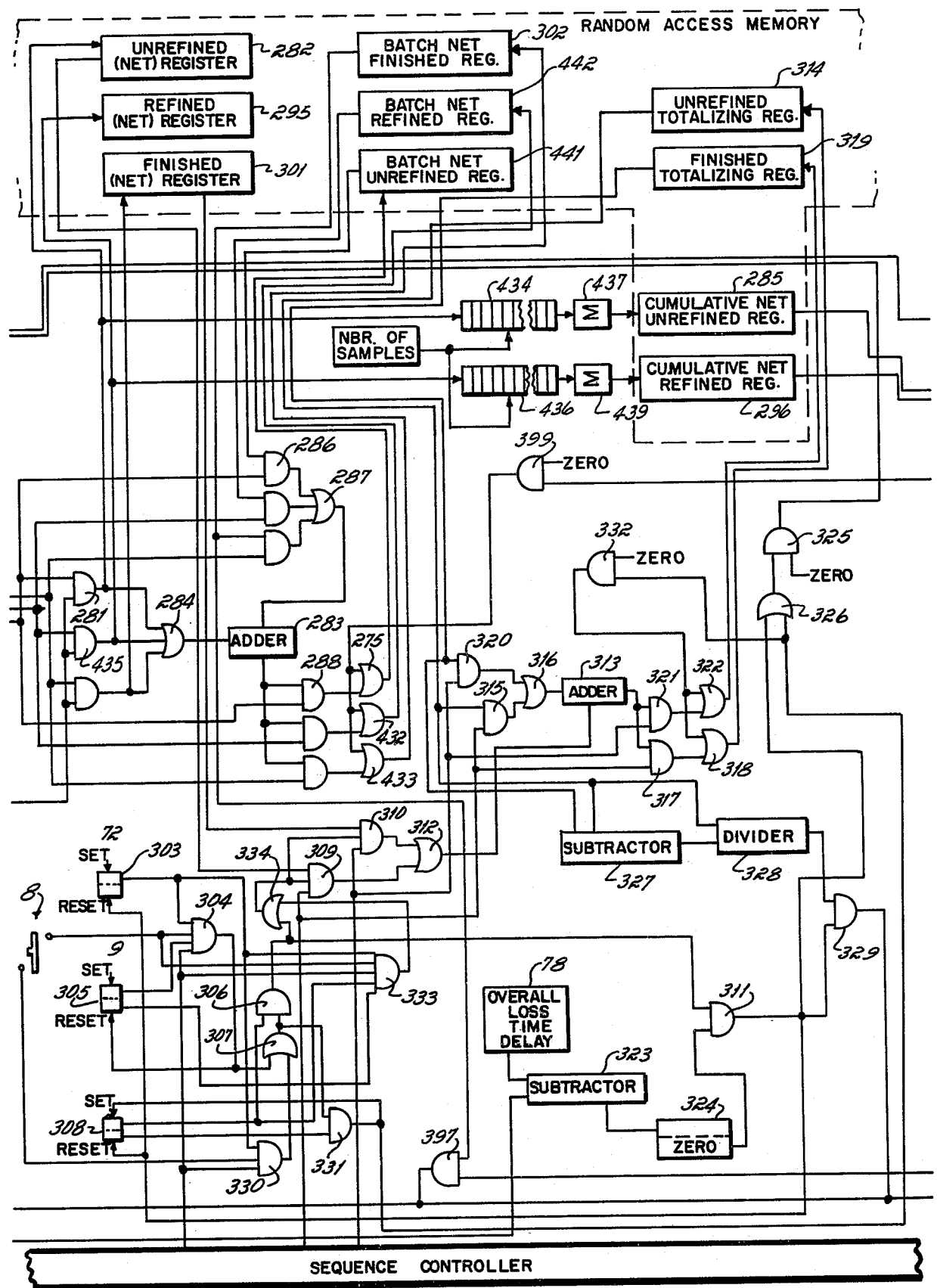
FIG. 6, including FIGS. 5A, 5B, 6C, 5D and 5E connected as shown, is a schematic diagram of a second embodiment for a monitoring system in accordance with the present invention.

Referring to FIGS. 5 and 6, sequence controller 200 steps the logic and arithmetic circuitry of FIGS. 5 and 6 through the operational sequence which is depicted in FIG. 4. As shown in FIG. 5A, the operator positions display select switch 62 to select the upper display to initiate entry of the time of day. A signal from display select switch 62 is input to AND gate 201. The operator then depresses data switch 77. A signal from data switch 77 enables AND gate 201. A signal from AND gate 201 is input to AND gate 202. The operator next positions data entry switch 73 to the enable position. The operator then depresses data input key 76. A signal from data input key 76 enables AND gate 203. A signal from AND gate 203 gates the time of day, which the operator has entered in manual data entry registers 75, via AND gate 203A to the input of AND gate 202. During the initialization phase sequence controller 200 and the signal from AND gate 201 gate data in manual data entry registers 75 via AND gate 202 to time of day register 204. The use of data in time of day register 204 will become apparent hereinafter.

Returning to FIG. 4A, the monitoring system of the present invention continues the initialization phase by reading default factors in a read only memory as indicated by machine function 103. These default factors, including data for correlation among unrefined, refined, and finished flow meters 11, 19, and 23 in FIG. 1 and a factor for the fluid coefficient of expansion, are entered into appropriate registers in random access memory as indicated by machine function 104. The use of the default factors will be described in detail below.

As shown in FIG. 5A, a signal from sequence controller 200 gates a default factor for the unrefined flow meter in read only memory register 209 via AND gate 205 to correlation factor for unrefined flow meter register 210. Subsequent signals from sequence controller 200 then sequentially gate (a) a default factor for the refined flow meter in read only memory register 211 via AND gate 206 to correlation factor for refined flow meter register 212, (b) a default factor for the finished flow meter in read only memory register 213 via AND gate 207 to correlation factor for finished flow meter register 214, and (c) a default factor for fluid coefficient of expansion in read only memory register 215 via AND gate 208 to fluid coefficient of expansion register 216.

The flow meter correlation default factors in read only memory registers 209, 211, and 213 are employed in net fluid amount computations which will be described in detail below. These default factors are used unless other correlation factors are entered by a manual data entry performed in a manner similar to that considered in connection with operator entry of the time of day or computed during a prove which will be described in detail below. The value of the default factor for each flow meter in read only memory registers 209, 211, and 213 is based either on (a) individual calibration of each flow meter or (b) information in literature which is supplied by the manufacturer of each flow meter. The default factor for the fluid coefficient of expansion in read only memory register 215 is also used in net fluid amount computations and is the nominal value for the fluid coefficient of expansion for the fluid being refined. This factor may be altered by a manual data entry. The default factors are entered into read only memory at the time the monitoring system is assembled.

Referring again to FIG. 4A, after the default factors have been entered in random access memory, the message file for printer 65 (FIG. 3) is reset as indicated by machine function 105. Immediately thereafter the message "up" is read from read only memory and entered in the printer message file as indicated by machine functions 106 and 107, respectively. A final step in the initialization phase is indicated by machine function 108 where data input flags, controlled by signals from various transducers and panel 56 (FIG. 3) controls associated with the monitoring system, are reset.

Referring to FIG. 5A, a signal from sequence controller 200 gates the "up" message in read only memory register 217 via AND gate 231 to printer message file 218. Signals from sequence controller 200 also reset monitoring system data input flags. Data input flags such as 219 comprise bistable circuit elements, or flip flops.

Returning to FIG. 4A, the first step of a monitoring cycle is to determine whether or not any of the data input flags have been set. Thus, the monitoring system reads the data input flags as indicated by machine function 109. The monitoring system first determines whether or not the manual printout flag is set as indicated by machine function 110. If machine function 110 indicates that the manual printout flag is set, the monitoring system resets the manual printout flag and enters data with regard to time of day, parameters, and loss in the printer message file as indicated by machine functions 111 and 112, respectively.

As shown in FIG. 5A, the operator sets manual printout flag 219 when he depresses manual printout command switch 70. If manual printout flag 219 is set, a signal from manual printout flag 219 is input to AND gate 229. A signal from sequence controller 200 enables AND gate 229. Consequently, a signal from AND gate 229 is input to AND gate 230. The signal from AND gate 229 resets manual printout flag 219 and gates data contained in registers in random access memory via AND gate 230 to printer message file 218.

Referring again to FIG. 4A, after the monitoring system completes steps 111 and 112 associated with an operator commanded printout or if machine function 110 indicates that the manual printout flag is not set, the monitoring system determines whether or not the real time clock flag is set as indicated by machine function 113. If machine function 113 indicates that the real time clock flag is not set, the monitoring system proceeds to a printout sequence which will be described below. If machine function 113 indicates that the real time clock flag has been set, the monitoring system resets the real time clock flag as indicated by machine function 114. The monitoring system then increments (a) the time of day, (b) the elapsed monitor time, and (c) the overall loss time as indicated by machine functions 115, 116, and 117, respectively.

As shown in FIG. 5A, electronic clock 232 is connected to the set input of real time clock flag 220. Sequence controller 200 and real time clock flag 220 are connected to the input of AND gate 233. When AND gate 233 is enabled, a signal from AND gate 233 gates the time increment in clock pulse counter 232a via AND gate 233a to adder 234. The signal from AND gate 233 also resets real time clock flag 220 and clock pulse counter 232a. Sequential signals from sequence controller 200 sequentially gate data in time of day register 204, elapsed monitor time register 235, and overall loss time register 236 via AND gates 237, 238, and 239, respectively, and OR gate 240 to adder 234. The sequential signals from sequence controller 200 also gate incremented values for the time of day, elapsed monitor time, and overall loss time via AND gates 241, 242, and 243, respectively, to registers 204, 235, and 236, respectively.

Referring again to FIG. 4A, after the monitoring system increments the time of day, elapsed monitor time, and overall loss time, it reads the automatic printout time interval as indicated by machine function 118 and determines whether or not the time of day is at a multiple of the printout time interval as indicated by machine function 119. If machine function 119 indicates that an automatic printout should be performed, the monitoring system enters data with regard to time of day, parameters, and loss in the printer message file as indicated by machine function 120.

Referring to FIG. 5A, to determine whether or not an automatic printout should be performed data in time of day register 204 is divided by data in printout time interval switch 78 in divider 244. The remainder in divider 244 enters register 245 of comparator 246. Comparator 246 compares data in register 245 with the value zero. If data in register 245 is zero, signals from comparator 246 and sequence controller 200 gate time of day, parameter, and loss data in random access memory via AND gate 247 to printer message file 218.

Returning to FIG. 4A, after step 119 or step 120 associated with an automatic printout the monitoring system reads the counts which represent the number of pulses generated by pulse generators 25, 26, and 27 associated with flow meters 11, 19, and 23 in FIG. 1, respectively, as indicated by machine function 121. The counts in the respective counters enter registers in random access memory and the counters are reset as indicated by machine functions 122 and 123, respectively. The monitoring system then proceeds to compute from the counts the net amounts of unrefined, refined, and finished fluid.

To calculate the net amount of fluid which has been metered at each flow meter station, each flow meter count in random access memory is corrected for moisture content, temperature, and meter calibration. The moisture contained in the unrefined fluid at flow meter 11 as determined by moisture content transducer 35 (FIG. 1) is read by the monitoring system as indicated by machine function 124 and entered in a register in random access memory as indicated by machine function 125. Similarly, the temperature of the unrefined fluid at flow meter 11 as determined by temperature transducer 32 (FIG. 1) is read by the monitoring system and entered in a register in random access memory as indicated by machine functions 126 and 127, respectively. The net amount of unrefined fluid is then calculated as indicated by machine function 128. The net amount of unrefined fluid calculated at step 128 is then added to the batch net amount of unrefined fluid in a register in random access memory and in the preferred embodiment to the cumulative net amount of unrefined fluid in a register in random access memory as indicated by machine function 129 (FIG. 4B).

As shown in FIG. 4B, the monitoring system performs a similar procedure to determine the net amount of refined fluid as it follows to determine the net amount of unrefined fluid. Thus, the moisture content and temperature of the refined fluid at flow meter 19 as determined by moisture content transducer 36 and temperature transducer 33 (FIG. 1) are read and entered in registers in random access memory as indicated by machine functions 130, 131, 132, and 133, respectively. The net amount of refined fluid is then calculated as indicated by machine function 134 and added to the batch net amount of refined fluid in a register in random access memory and in the preferred embodiment to the cumulative net amount of refined fluid in a register in random access memory as indicated by machine function 135.

Since the finishing process contemplates the use of vacuum dryer 21 (FIG. 1), the monitoring system does not necessarily employ a moisture content transducer to determine the amount of moisture in finished fluid. Thus, the monitoring system preferably reads only the temperature of the finished fluid and enters the temperature of the finished fluid in a register in random access memory as indicated by machine functions 136 and 137, respectively. The net amount of finished fluid is then calculated and added to the batch net amount of finished fluid in a register in random access memory as indicated by machine functions 138 and 139, respectively. A moisture content transducer could be employed if the finishing process did not call for complete vacuum drying. Thus, a moisture content transducer would be employed at each flow meter station as is the case in the pipeline leakage detection monitoring system depicted in FIG. 2.

As shown in FIG. 5B, unrefined counter 248 counts pulses from pulse generator 25 associated with flow meter 11 (FIG. 1). Similarly, refined counter 249 and finished counter 250 count pulses from pulse generators 26 and 27 associated with flow meters 19 and 23 (FIG. 1), respectively. Signals from sequence controller 200 sequentially gate the counter in counters 248, 249, and 250 via AND gates 251, 252, and 253 to unrefined (gross) register 254, refined (gross) register 255, and finished (gross) register 256, respectively. The sequential signals from sequence controller 200 also reset counters 248, 249, and 250.

A signal from moisture content transducer 35 for unrefined fluid is input to A/D converter 257. A signal from sequence controller 200 gates the output from A/D converter 257 via AND gate 258 to unrefined moisture register 259. Similarly, a signal from temperature transducer 32 for unrefined fluid is input to A/D converter 260. A signal from sequence controller 200 gates the output from A/D converter 260 via AND gate 261 to unrefined temperature register 262.

To calculate the net amount of unrefined fluid, a signal from sequence controller 200 gates data in unrefined temperature register 262 via AND gate 263 to the input of OR gate 264. The temperature of the unrefined fluid enters subtractor 265 via OR gate 264. subtractor 265 subtracts the temperature of the unrefined fluid from 50° C. The difference in subtractor 265 enters multiplier 266. Multiplier 266 multiplies the difference between 50° C. and the temperature of the unrefined fluid from subtractor 265 by data in fluid coefficient of expansion register 216 (FIG. 5A). The product in multiplier 266 enters adder 267, where adder 267 adds the product from multiplier 266 to one. The sum in adder 267 enters multiplier 268.

The signal from sequence controller 200 also gates data in unrefined moisture register 259 via AND gate 269 to the input of OR gate 270. The unrefined moisture content enters subtractor 271 via OR gate 270. The signal from sequence controller 200 gates data in unrefined (gross) register 254 via AND gate 279 and OR gate 280 to subtractor 271. Subtractor 271 subtracts the moisture content from the gross amount of unrefined fluid. The difference in subtractor 271 enters multiplier 278 via OR gate 272.

The signal from sequence controller 200 also gates data in correlation factor for unrefined flow meter register 210 (FIG. 5A) via AND gate 276 and OR gate 277 to multiplier 268. Multiplier 268 multiplies the temperature correction factor for the unrefined fluid represented by the sum in adder 267 by the unrefined flow meter correlation factor. The product in multiplier 268 enters multiplier 278.

Multiplier 278 computes the product of the moisture corrected gross unrefined fluid amount and the combined temperature correction and flow meter correlation factor to produce the net amount of unrefined fluid. A signal from sequence controller 200, via OR gate 443 (FIG. 5C), gates the product in multiplier 278 via AND gate 281 to unrefined (net) register 282 (FIG. 5C).

As shown in FIG. 5C, in the preferred embodiment, the net amount of unrefined fluid is also input to adder 283 via OR gate 284. The signal from sequence controller 200 gates data in cumulative net unrefined register 285 via AND gate 286 and OR gate 287 to adder 283. The signal from sequence controller 200 also gates the sum in adder 283 via AND gate 288 to cumulative net unrefined register 285, thereby updating the cumulative net amount of unrefined fluid.

A subsequent signal from sequence controller 200, via OR gate 443, gates the product in multiplier 278 (FIG. 5B) via AND gate 281 and OR gate 284 to adder 283. This subsequent signal from sequence controller 200 gates data in batch net unrefined register 441 via AND gate 444 and OR gate 287 to adder 283. This subsequent signal from sequence controller 200 also gates the sum in adder 283 via AND gate 445 and OR gate 275 to batch net unrefined register 441, thereby updating the batch net amount of unrefined fluid.

Computation of the net amount of refined fluid parallels computation of the net amount of unrefined fluid. Referring to FIG. 5B, a signal from moisture content transducer 36 is input to A/D converter 289. A signal from sequence controller 200 gates the output of A/D converter 289 via AND gate 290 to refined moisture register 291. A signal from temperature transducer 33 is input to A/D converter 292. A signal from sequence controller 200 gates the output from A/D converter 292 via AND gate 293 to refined temperatures register 294.

The calculation of the net amount of refined fluid involves use of data in refined (gross) register 255, refined temperature register 294, refined moisture register 291, correlation factor for refined flow meter register 212 (FIG. 5A), and fluid coefficient of expansion register 216 (FIG. 5A). The net amount of refined fluid is entered in refined (net) register 295 (FIG. 5C). In the preferred embodiment the net amount of refined fluid is added to the cumulative net amount of refined fluid in register 296 (FIG. 5C), thereby updating the cumulative net amount of refined fluid. The net amount of refined fluid is added to the batch net amount of refined fluid in register 442, thereby updating the batch net amount of refined fluid.

The computation of the net amount of finished fluid parallels in all respects but one the computation of the net amounts of unrefined and refined fluid. As pointed out above with regard to finished fluid, vacuum dryer 21 (FIG. 1) is assumed to remove all moisture. Thus, no moisture content transducer has been employed at the finished fluid flow meter station. Referring to FIG. 5B, a signal from temperature transducer 34 is input to A/D converter 297. A signal from sequence controller 200 gates the output from A/D converter 297 via AND gate 298 to finished temperature register 299.

The computation of the net amount of finished fluid involves data in finished (gross) register 256, finished temperature register 299, correlation factor for finished flow meter register 214 (FIG. 5A), and fluid coefficient of expansion register 216 (FIG. 5A). Since the finished fluid is assumed to have no moisture content, subtractor 271 is not used in the computation of the net amount of finished fluid. Instead, a signal from sequence controller 200 gates data in finished (gross) register 256 via AND gate 300 and OR gate 272 directly to multiplier 278. The net amount of finished fluid enters finished (net) register 301 (FIG. 5C). The batch net amount of finished fluid is updated by adding the net amount of finished fluid to data in batch net finished register 302 and entering the sum in batch net finished register 302.

In summary, fluid which flows through each flow meter along the refining process in FIG. 1 drives a rotor which is a component of the flow meter. The rotor in turn drives a pulse generator. The pulse generator is connected to a counter which counts pulses from the pulse generator. The count is representative of a volume of fluid which has flowed through the flow meter.

The moisture content of fluid which flows through each flow meter along the refining process in FIG. 1 can vary. For example, water is added to fluid in water wash centrifuge 17 and water is removed from fluid in vacuum dryer 21. Indications with regard to loss of vegetable oil will not be meaningful unless the volumes of fluid attributable to water are subtracted from flow meter volumetric measurements before loss computations are performed. Thus, moisture content transducers at the unrefined and refined flow meter stations measure volumes of water in fluid. The monitoring system subtracts volumes of water measured by the unrefined and refined moisture content transducers from volumes of fluid measured by the unrefined and refined flow meters. It is generally not necessary to account for moisture content of finished fluid since vacuum dryer 21 is designed to remove water before the fluid flows through the finished flow meter.

The temperature of fluid which flows through each flow meter along the refining process in FIG. 1 can also vary. Unrefined fluid, for example, which is often stored in an outdoor tank, may be flowed through a heater (not shown) before entering refining centrifuge 13. Since the volume of fluid varies with temperature, flow meter volumetric measurements must be corrected to a standard temperature or indications with regard to loss of vegetable oil will not be meaningful. For the vegetable oil refining process used to illustrate the application of the monitoring system of the present invention, 50° C. is chosen as the standard temperature. 50° C. is approximately the average temperature of the fluid over the period of time during which fluid is transformed from unrefined to finished product. Temperature transducers measure the temperature of the fluid at the flow meter stations. The monitoring system subtracts the measured temperature from 50° C. and multiplies the difference by the coefficient of expansion for the fluid, which may be (a) the nominal, or default factor, value for the coefficient of expansion for the fluid being refined or (b) a value for the coefficient of expansion for the fluid being refined which is determined by laboratory analysis and manually entered by the operator. Since the fluid coefficient of expansion varies with water or impurities in the vegetable oil, a different fluid coefficient of expansion could be determined for the fluid which flows through each flow meter station. In practice, however, applicants have found that satisfactory monitoring can be performed using a nominal, or average, value for the coefficient of expansion for fluid along the refining process in FIG. 1 to determine net fluid amounts. The product of (a) the temperature difference at each flow meter station and (b) the coefficient of expansion for the fluid is added to one to compute temperature correction factors for the fluid which flows through each flow meter station. The moisture compensated flow meter volumetric measurements are multiplied by the respective temperature correction factors.

The net fluid amounts for each flow meter station are then computed by multiplying each moisture compensated and temperature corrected flow meter volumetric measurement by a flow meter correlation factor. As described above, the flow meter correlation factors may be (a) the flow meter calibration, or default factor, values obtained by conventional flow meter calibration methods or from flow meter manufacturer data or (b) correlation factors based on a "prove" during actual operation of the refining process which will described below. As will be described below the losses for vegetable oil computed by the monitoring system of the present invention are based on net fluid amounts to significantly reduce inaccuracies due to water content of the volume of fluid measured by the flow meters, temperature variations along the refining process, and differences among the flow meters.

Referring again to FIG. 4B, the monitoring system next determines whether or not the overall loss printout command flag is set as indicated by machine function 140. If machine function 140 indicates that the operator has selected an overall loss printout, the monitoring system determines whether or not level indicator switch 9 (FIG. 1) is enabled as indicated by machine function 141. If machine function 141 indicates that level indicator switch 9 (FIG. 1) is enabled, the monitoring system, as indicated by machine function 142, determines whether or not the level indicator flag is set.

If machine function 142 indicates that the level indicator flag is set, the monitoring system resets the level indicator flag and then determines whether or not the overall loss cycle flag is set as indicated by machine functions 143 and 144, respectively.

The overall loss cycle flag indicates whether or not an overall loss computation cycle is in progress. The overall loss cycle flag will not be set the first time the monitoring system determines that the level indicator flag is set. Thus, the monitoring system resets the overall loss time to zero, resets the totalizing registers for the unrefined and finished fluid, and sets the overall loss cycle flag as indicated by machine functions 145, 146, and 147, respectively, thereby initiating an overall loss computation cycle.

If machine function 144 indicates that the overall loss cycle flag is set, this indicates that an overall loss computation cycle is in progress. The monitoring system, therefore, adds the net amounts of unrefined and finished fluid calculated at machine functions 128 (FIG. 4A) and 138 to the amounts in the unrefined and finished overall loss totalizing registers as indicated by machine function 148. The monitoring system then reads the time delay and determines whether or not the overall loss time exceeds the time delay as indicated by machine functions 149 and 150, respectively.

If machine function 150 indicates that the overall loss time exceeds the time delay, the monitoring system resets the overall loss flag and the overall loss cycle flag, resets the overall loss time, calculates the overall loss, and enters the overall loss in the printer message file as indicated by machine functions 151, 152, 153, 154, and 155 in FIG. 4C, respectively.

If level indicator switch 9 (FIG. 1) is enabled but the level indicator flag is not set, as indicated by machine functions 141 and 142 in FIG. 4B, the monitoring system determines, as indicated by machine function 156, whether or not the overall loss cycle flag is set. Thus, the monitoring system determines at machine function 156 whether or not an overall loss computation cycle is in progress. If machine function 156 indicates that an overall loss computation cycle is in progress, the monitoring system adds the net amounts of unrefined and finished fluid to the amounts contained in the unrefined and finished totalizing registers as indicated by machine function 157.

If machine function 141 indicates that level indicator switch 9 (FIG. 1) is not enabled, the monitoring system initiates an overall loss computation cycle over a period of time the minimum duration of which is determined by the time delay mentioned above. Machine function 158, comprising the determination whether or not the overall loss cycle flag is set, indicates whether an overall loss computation cycle should be initiated or whether an overall loss computation is in progress. Thus, machine function 158, which relates to a time interval overall loss computation cycle, is parallel to machine function 144, which relates to a level indicator switch/time delay overall loss computation cycle. The provision of both modes of overall loss computation adds flexibility to the monitoring system in monitoring the loss which results from the transformation of unrefined fluid to finished fluid.

Referring to FIG. 5C, the operator sets overall loss flag 303 by depressing overall loss printout command switch 72. If overall loss flag 303 is set, a signal from overall loss flag 303 is input to AND gate 304. On/off switch 8 determines whether or not level indicator switch 9 is enabled or disabled. If level indicator switch 9 is enabled, a signal from on/off switch 8 is input to AND gate 304. If level indicator switch 9 is activated by the level of fluid in vacuum dryer 21 (FIG. 1), level indicator switch 9 sets level indicator flag 305. If level indicator flag 305 is set, a signal from level indicator flag 305 is input to AND gate 304. Consequently, when sequence controller 200 signals AND gate 304, a signal from AND gate 304 resets level indicator flag 305 and is also input to AND gate 306 via OR gate 307.

The first time that overall loss flag 303 is set, overall loss cycle flag 308 will not be set. Thus, whether level indicator switch 9 is enabled or disabled, as determined by the position of on/off switch 8, the signal from OR gate 307 and a signal from overall loss cycle flag 308 enable AND gate 331. A signal from AND gate 331 is input to AND gate 325 via OR gate 326. The signal from AND gate 331 gates zero via AND gate 325 to overall loss time register 236 (FIG. 5A), thereby resetting the overall loss time. The signal from AND gate 331 is also input to AND gate 332. Thus, the signal from AND gate 331 also gates zero via AND gate 332 and OR gates 318 and 322 to unrefined and finished fluid totalizing registers 314 and 319, respectively, thereby resetting the unrefined and finished totalizing registers. Finally, the signal from AND gate 331 sets overall loss cycle flag 308 so that overall loss cycle flag 308 indicates during the next cycle that an overall loss computation cycle is in progress.

During a subsequent cycle, if level indicator flag 305 is set, a signal from overall loss cycle flag 308 and a signal from AND gate 304 via OR gate 307 enable AND gate 306. A signal from AND gate 306 is input to AND gates 309 and 310, via OR gate 334, and to AND gate 311. Unrefined (net) register 282 is connected to the input of AND gate 309. A signal from sequence controller 200 together with the signal from AND gate 306 gate data in unrefined (net) register 282 via AND gate 309 and OR gate 312 to adder 313. The signal from sequence controller 200 also gates data in unrefined totalizing register 314 via AND gate 315 and OR gate 316 to adder 313. Adder 313 sums data in unrefined (net) register 282 and data in unrefined totalizing register 314. The signal from sequence controller 200 gates the sum in adder 313 via AND gate 317 and OR gate 318 to unrefined totalizing register 314, thereby updating the total amount of unrefined fluid input to the refining process during the overall loss computation cycle.

Data in finished totalizing register 319 is updated in a procedure similar to that described for the update of data in unrefined totalizing register 314. A subsequent signal from sequence controller 200 and a signal from AND gate 306 gate data in finished (net) register 301 via AND gate 310 and OR gate 312 to adder 313. The signal from sequence controller 200 also gates data in finished totalizing register 319 via AND gate 320 and OR gate 316 to adder 313. The signal from sequence controller 200 gates the sum in adder 313 via AND gate 321 and OR gate 322 to finished totalizing register 319, thereby updating the total amount of finished fluid output from the finishing process during the overall loss computation cycle.

After the total net amounts of unrefined and finished fluid have been updated, subtractor 323 generates the difference between data in overall loss time register 236 (FIG. 5A) and an overall loss time delay in time interval switches 78. Comparator 324 compares the difference in subtractor 323 with the value zero. If the difference in subtractor 323 is greater than or equal to zero, a signal from comparator 324 is input to AND gate 311. Upon the coincidence of signals from AND gate 306 and comparator 324, a signal from AND gate 311 resets overall loss flag 303 and overall loss cycle flag 308. The signal from AND gate 311 is also input to AND gate 325 via OR gate 326, thereby gating zero via AND gate 325 to overall loss time register 236 (FIG. 5A) to reset the overall loss time.

Subtractor 327 generates the difference between data is unrefined totalizing register 314 and data in finished totalizing register 319. The difference in subtractor 327, which represents the overall loss, is preferably input to divider 328 which divides the difference in subtractor 327 by the total net amount of unrefined fluid in unrefined totalizing register 314, thereby generating the overall loss as a ratio between the total finished fluid output from and the total unrefined fluid input to the refinery being monitored. If the overall loss time exceeds the time delay and the overall loss flag and overall loss cycle flag are set, the signal from AND gate 311 gates the overall loss via AND gate 329 to printer message file 218 (FIG. 5A).

If the monitoring system is operating in the mode in which level indicator switch 9 is enabled by on/off switch 8 and level indicator flag 305 is not set during a subsequent cycle while an overall loss computation cycle is in progress, AND gate 333 is enabled. A signal from AND gate 333 is input to AND gates 309 and 310 via OR gate 334, thereby initiating an update of data in unrefined and finished totalizing registers 314 and 319 in a manner parallel to that which is described above.

If level indicator switch 9 is disabled, the overall loss is computed after the overall loss time exceeds the overall loss time delay. In this situation, signals from sequence controller 200, overall loss flag 303 and level indicator on/off switch 8 enable AND gate 330. A signal from AND gate 330 is input to AND gate 306 via OR gate 307. If overall loss cycle flag 308 is set, AND gate 306 is enabled. A signal from AND gate 306 is input to AND gates 309 and 310, via OR gate 334, and to AND gate 311. The unrefined and finished fluid amount totals in totalizing registers 314 and 319 are updated.

The overall loss time is then compared with the overall loss time delay, and, if the overall loss time exceeds the overall loss time delay, overall loss flag 303 and overall loss cycle flag 308 are reset. Overall loss time register 236 (FIG. 5A) is reset to zero. The overall loss is calculated and entered in printer message file 218 (FIG. 5A).

The above describes the operation of the monitoring system when an overall loss computation cycle is selected by the operator. The overall loss computation cycle is controlled by either (a) a level indicator switch in conjunction with a time delay or (b) a time delay. The level indicator switch in vacuum dryer 21 (FIG. 1) is used to sense the level of fluid so that overall changes in the volume of fluid in vacuum dryer 21 (FIG. 1) during an overall loss computation cycle do not affect the overall loss. Thus, fluctuation of the fluid level in vacuum dryer 21 (FIG. 1) does not cause error in the overall loss.

Returning to FIGS. 4B and 4C, the monitoring system proceeds from the overall loss computation cycle to the intermittent loss computation cycle after one of six steps. If machine function 140 indicates that the overall loss flag is not set, the monitoring system bypasses the overall loss computation cycle. After the initialization phase for the overall loss computation cycle is complete, i.e., after step 147, the monitoring system also proceeds to the intermittent loss computation cycle. Thirdly, if during an overall loss computation cycle the overall loss time does not exceed the time delay as indicated by machine function 150, the monitoring system proceeds to the intermittent loss computation cycle. The intermittent loss computation cycle is also entered if the monitoring system is operating with the level indicator switch enabled, but the level indicator flag and the overall loss cycle flag are not set as indicated by machine function 156; or, if the overall loss cycle flag is set, after the unrefined and finished totalizing registers are updated as indicated by machine function 157. The monitoring system also enters the intermittent loss computation cycle after determination and entry in the printer message file of the overall loss at step 155.

The monitoring system initiates the intermittent loss computation cycle by reading the minimum unrefined sample size as indicated by machine function 159. The minimum unrefined sample size read at step 159 constitutes the threshold amount of unrefined fluid which must be input to the refining process before an intermittent loss computation cycle will be performed by the monitoring system. The minimum unrefined sample size may be based on the amount of unrefined fluid which must be input to the refining process before refined fluid is output from the refining process to the finishing process. This amount depends upon the volume of the various chemical processing elements and interconnecting pipes used in the refinery process. In this manner the monitoring system accounts for the propagation constant of fluid through the refining process. Accumulation of a minimum unrefined sample size before initiating computation of the first intermittent loss tends to minimize the effect of surges or instability in operation of the refining process immediately after processing is commenced, for example, following cleaning or repair of a chemical processing element. The monitoring system then determines whether or not the cumulative net amount of unrefined fluid is greater than the minimum unrefined sample size as indicated by machine function 160.

If machine function 160 indicates that the cumulative net amount of unrefined fluid exceeds the minimum unrefined sample size, the monitoring system calculates the current loss as a percentage of the cumulative net amount of unrefined fluid input to the refining process being monitored as indicated by machine function 161. The monitoring system then determines whether or not the intermittent loss cycle flag is set as indicated by machine function 162. The first time that the monitoring system enters the intermittent loss computation cycle, machine function 162 will indicate that the intermittent loss cycle flag is not set. Accordingly, the monitoring system enters the current percentage loss calculated at step 161 in the reference percentage loss register as indicated by machine function 163. The monitoring system thereafter sets the intermittent loss cycle flag and also resets the reference loss increment to zero as indicated by machine functions 164 and 165, respectively.

During subsequent intermittent loss computation cycles machine function 162 will indicate that the intermittent loss cycle flag is set. As a result, the monitoring system reads the number of computations or statistical samples which the operator has entered in sample number selector 57 (FIG. 3) as indicated by machine function 166. The number which the operator enters in sample number selector 57 (FIG. 3) actually is a smoothing or averaging factor. The effect of this smoothing or averaging factor, as will be described in detail below, is that (a) sudden disturbances and (b) changes in operation of the refining process are not reflected entirely in the intermittent loss computed for the just elapsed interval of operation but spread over a number of intervals of operation corresponding to the number in sample number selector 57 (FIG. 3). The monitoring system then determines whether or not the number of computations or statistical samples is zero as indicated by machine function 167.

If machine function 167 indicates that the number of computations or statistical samples is zero, the monitoring system enters the current percentage loss calculated at step 161 in the reference percentage loss register as indicated by machine function 168. Thus, if the number of computations or statistical samples is zero, the monitoring system displays the current percentage loss of unrefined fluid in the refining process as the intermittent loss, as will be described in more detail below.

If machine function 167 indicates that the number of computations or statistical samples exceeds zero, the current percentage loss of unrefined fluid is smoothed or averaged over the number of computations or statistical samples read at step 166, thereby distributing the loss of unrefined fluid which occurs during any one interval of operation over a number of intervals corresponding in number to the number of computations or statistical samples. The monitoring system calculates a current loss increment based on the current percentage loss and the number of computations or statistical samples as indicated by machine function 169.

Thereafter, the monitoring system determines whether or not the current loss increment has the same sign as the reference loss increment as indicated by machine function 170. If the signs are different, the current loss increment is substituted for the reference loss increment as indicated by machine function 171.

If machine function 170 indicates that the signs of the current and reference loss increments are the same, the monitoring system determines whether or not the magnitude of the current loss increment exceeds the magnitude of the reference loss increment as indicated by machine function 172. If machine function 172 indicates that the magnitude of the current loss increment exceeds the magnitude of the reference loss increment, the current loss increment is substituted for the reference loss increment as indicated by machine function 171.

If the magnitude of the current loss increment does not exceed the magnitude of the reference loss increment, the monitoring system determines whether or not the current loss increment is equal to zero as indicated by machine function 173. If machine function 173 indicates that the current loss increment equals zero, zero is substituted for the reference loss increment as indicated by machine function 171.

Where the number of computations or statistical samples exceeds zero, the reference loss increment is added to the reference percentage loss as indicated by machine function 174 whereby the loss at the time of the computation is effectively distributed over a series of intermittent losses. The reference percentage loss determined either by machine function 163, machine function 168, or machine function 174 is displayed in LED display 58 (FIG. 3) as indicated by machine function 175.

The monitoring system also reads the trend recorder scale factor which the operator enters in trend zero selector 60 (FIG. 3), calculates a trand recorder signal, and outputs the signal to trend recorder 59 (FIG. 3) as indicated by machine functions 176, 177, and 178, respectively. Trend recorder 59 (FIG. 3), therefore, records either (a) the current percentage losses of unrefined fluid, if the number of computations or statistical samples is one, or (b) a trend loss for unrefined fluid input to the refining process if the number of computations or statistical samples is greater than one, providing a step-like characteristic for a series of intermittent losses in the event of sudden disturbances and changes which occur during operation of the refining process.

Referring to FIG. 5D, the minimum unrefined sample size from manual data entry registers 75 enters subtractor 335. In the preferred embodiment, the cumulative net amount of unrefined fluid in register 285 (FIG. 5C) also enters subtractor 335. Subtractor 335 generates the difference between the cumulative net amount of unrefined fluid and the minimum unrefined sample size and outputs the difference to comparator 336. Comparator 336 compares the difference from substractor 335 with the value zero. If the difference is greater than zero, a signal from comparator 336 is input to AND gate 337.

The signal from comparator 336 and a signal from sequence controller 200 enable AND gate 337 if the cumulative net amount of unrefined fluid exceeds the minimum unrefined sample size. A signal from AND gate 337 is input to AND gates 338 and 339. The signal from AND gate 337 gates data in cumulative net unrefined register 285 (FIG. 5C) via AND gate 338 to subtractor 340. The signal from AND gate 337 also gates data in cumulative net refined register 296 via AND gate 339 to subtractor 340.

The difference between the cumulative net unrefined and refined fluid amounts in subtractor 340 enters divider 341. Data in cumulative net unrefined register 285 (FIG. 5C) also enters divider 341. Consequently, divider 341 generates the current loss as a percentage of the cumulative net amount of unrefined fluid.

During the first intermittent loss computation cycle, intermittent loss cycle flag 342 is not set. A signal from intermittent loss cycle flag 342 is input to AND gate 380. The signal from intermittent loss cycle flag 342 and a signal from sequence controller 200 enable AND gate 380. A signal from AND gate 380 sets intermittant loss cycle flag 342. Also during this initialization of the intermittent loss computation cycle, the signal from AND gate 380 gates zero via AND gate 381 and OR gate 378 to reference loss increment register 349, thereby resetting the reference loss increment to zero. Finally, the signal from AND gate 380 is input to OR gate 274. A signal from OR gate 274 gates the current percentage loss via AND gate 379 and OR gate 375 to reference percentage loss register 347.

During a subsequent cycle, a signal from intermittent loss cycle flag 342 is input to AND gate 343. Together with a signal from sequence controller 200, the signal from intermittent loss cycle flag 342 gates the number of computations or statistical samples in sample number selector 57 via AND gate 343 to comparator 344. Comparator 344 compares the number of computations or statistical samples with the value zero.

If the number in sample number selector 57 is zero, a signal from comparator 344 is input to OR gate 274. Consequently, a signal from OR gate 274 gates the current percentage loss via AND gate 379 and OR gate 375 to reference percentage loss register 347. This produces in reference percentage loss register 347 the current percentage loss of unrefined fluid.

If the number in sample number selector 57 exceeds zero, a signal from comparator 344 is input to AND gates 345 amd 346. The signal from comparator 344 gates the difference in subtractor 273 between (a) data in reference percentage loss register 347 and (b) the current percentage loss via AND gate 345 to divider 348. The signal from comparator 344 also gates the number in sample number selector 57 via AND gate 346 to divider 348. Divider 348 consequently generates the current loss increment.

The monitoring system next determines whether or not the current loss increment in divider 348 has the same sign as the reference loss increment in register 349. The current loss increment in divider 348 and data in reference loss increment register 349 enter subtractor 350. Subtractor 350 generates the difference between the reference loss increment and the current loss increment. The difference in subtractor 350 is input to register 351 of comparator 352. The reference loss increment is input to register 353 of comparator 352.

Continuing with the sequence of determining whether or not the current and reference loss increments have the same sign, the reference loss increment is also input to multiplier 354 which generates the square of the reference loss increment. The square of the reference loss increment in multiplier 354 enters square rooter 355. The square root in square rooter 355 enters register 356 of comparator 357 where it is compared with the reference loss increment input to register 358 of comparator 357.

If data in register 353 of comparator 352 equals or exceeds data in register 351 of comparator 352, a signal from comparator 352 is input to AND gate 359 and AND gate 360 indicating that the current loss increment is positive or zero. If data in register 353 of comparator 352 is less than data in register 351 of comparator 352, a signal from comparator 352 is input to AND gate 361 and AND gate 362 indicating that the current loss increment is negative.

If data in register 356 of comparator 357 equals data in register 358 of comparator 357, a signal from comparator 357 is input to AND gate 359 and AND gate 362 indicating that the reference loss increment is positive or zero. If data in register 356 of comparator 357 is not equal to data in register 358 of comparator 357, a signal from comparator 357 is input to AND gate 360 and AND gate 361 indicating that the reference loss increment is negative.

A signal from AND gate 359 or AND gate 361 is input via OR gate 363 to AND gate 370 when the signs of the reference loss increment and the current loss increment are the same. A signal from AND gate 360 or AND gate 362 is input via OR gate 364 to OR gate 371 when the signs of the reference loss increment and the current loss increment differ.

The monitoring system determines whether or not the magnitude of the current loss increment is greater than the magnitude of the reference loss increment. The magnitude of the reference loss increment in square rooter 355 enters register 365 of comparator 366. The current loss increment enters multiplier 367 which generates the square of the current loss increment. The square of the current loss increment in multiplier 367 enters square rooter 368 which generates the magnitude of the current loss increment. The magnitude of the current loss increment in square rooter 368 enters register 369 of comparator 366.

A signal from comparator 366 is input to AND gate 370 if the magnitude of the current loss increment is less than the magnitude of the reference loss increment. If the magnitude of the reference loss increment is less than the magnitude of the current loss increment, a signal from comparator 366 is input to OR gate 371.

The monitoring system also determines whether or not the current loss increment is zero. The current loss increment is input to comparator 372 where it is compared with the value zero. If the current loss increment is zero, a signal from comparator 372 is input to OR gate 371. If the current loss increment is not zero, a signal from compressor 372 is input to AND gate 370.

As described above, if the current loss increment and reference loss increment have the same sign, a signal from OR gate 363 is input to AND gate 370. If the magnitude of the current loss increment does not exceed the magnitude of the reference loss increment, a signal from comparator 366 is input to AND gate 370. Also, if the current loss increment is not equal to zero, a signal from comparator 372 is input to AND gate 370. Under these conditions a signal from sequence controller 200 causes AND gate 370 to become enabled. Consequently, a signal from AND gate 370 gates the sum of the reference loss increment and the reference percentage loss in adder 374 via AND gate 373 and OR gate 375 to reference percentage loss register 347.

As described above, if the signs of the current loss increment and the reference loss increment differ, a signal from OR gate 364 is input to OR gate 371. If the magnitude of the current loss increment exceeds the magnitude of the reference loss increment, a signal from comparator 366 is input to OR gate 371. Also, if the current loss increment is equal to zero, a signal from comparator 372 is input to OR gate 371. In any of these cases, a signal from OR gate 371 is input to AND gate 376 and AND gate 377. The signal from OR gate 371 gates the current loss increment via AND gate 376 and OR gate 378 to reference loss increment register 349, thereby updating the reference loss increment. The signal from OR gate 371 in conjunction with a signal from sequence controller 200 subsequently gates the sum of the updated reference loss increment and the reference percentage loss in adder 374 via AND gate 377 and OR gate 375 to reference percentage loss register 347.

At the end of the intermittent loss computation cycle a signal from sequence controller 200 gates the reference percentage loss in register 347 via AND gate 382 to LED display 58. The reference percentage loss is also input to subtractor 383. Subtractor 383 subtracts from the reference percentage loss a strip chart recorder scale factor in trend zero selector 60. A signal from sequence controller 200 gates the difference in subtractor 383 via AND gate 384 to digital to analog (D/A) converter 385. D/A converter 385 generates an analog signal for strip chart recorder 59.

TABLE I

| Interval # | Net Unrefined Gals. Or Lbs. For Interval | Net Refined Gals. Or Lbs. For Interval | Cumulative Net Unrefined Gals. Or Lbs. | Cumulative Net Refined Gals. Or Lbs. | (X) Intermittent Loss (Gain) % For Interval | (Y) Intermittent Loss (Gain) % For Cumulative | (Z) Intermittent Loss (Gain)% For Cumulative With Multiple Samples |
|---|---|---|---|---|---|---|---|
| 1 | 30 | 29 | 30 | 29 | 3.33 | 3.33 | 3.33 |
| 2 | 6 | 6 | 36 | 35 | 0.00 | 2.78 | 3.22 |
| 3 | 5 | 4 | 41 | 39 | 20.00 | 4.88 | 3.55 |
| 4 | 7 | 7 | 48 | 46 | 0.00 | 4.17 | 3.88 |
| 5 | 6 | 6 | 54 | 52 | 0.00 | 3.70 | 3.85 |
| 6 | 5 | 6 | 59 | 58 | (20.00) | 1.69 | 3.42 |
| 7 | 5 | 5 | 64 | 63 | 0.00 | 1.56 | 2.98 |
| 8 | 5 | 5 | 69 | 68 | 0.00 | 1.45 | 2.55 |
| 9 | 6 | 5 | 75 | 73 | 16.67 | 2.67 | 2.58 |
| 10 | 5 | 4 | 80 | 77 | 20.00 | 3.75 | 2.81 |

TABLE I-continued

| Interval # | Net Unrefined Gals. Or Lbs. For Interval | Net Refined Gals. Or Lbs. For Interval | Cumulative Net Unrefined Gals. Or Lbs. | Cumulative Net Refined Gals. Or Lbs. | (X) Intermittent Loss (Gain) % For Interval | (Y) Intermittent Loss (Gain) % For Cumulative | (Z) Intermittent Loss (Gain)% For Cumulative With Multiple Samples |
|---|---|---|---|---|---|---|---|
| 11 | 6 | 5 | 86 | 82 | 16.67 | 4.65 | 3.18 |
| 12 | 7 | 7 | 93 | 89 | 0.00 | 4.30 | 3.55 |
| 13 | 6 | 7 | 99 | 96 | (16.67) | 3.03 | 3.44 |
| 14 | 5 | 6 | 104 | 102 | (20.00) | 1.92 | 3.14 |
| 15 | 5 | 6 | 109 | 108 | (20.00) | 0.92 | 2.69 |
| 16 | 6 | 7 | 115 | 115 | (16.67) | 0.00 | 2.16 |
| 17 | 5 | 6 | 120 | 121 | (20.00) | (0.83) | 1.56 |
| 18 | 6 | 7 | 126 | 128 | (16.67) | (1.59) | 0.93 |
| 19 | 5 | 2 | 131 | 130 | 60.00 | 0.76 | 0.30 |
| 20 | 6 | 6 | 137 | 136 | 0.00 | 0.73 | 0.39 |
| 21 | 5 | 4 | 142 | 140 | 20.00 | 1.41 | 0.59 |
| 22 | 7 | 7 | 149 | 147 | 0.00 | 1.34 | 0.80 |
| 23 | 7 | 7 | 156 | 154 | 0.00 | 1.28 | 1.00 |
| 24 | 7 | 8 | 163 | 162 | (14.29) | .61 | 0.92 |
| 25 | 5 | 4 | 168 | 166 | 20.00 | 1.19 | 0.98 |
| 26 | 5 | 3.5 | 173 | 169.5 | 30.00 | 2.02 | 1.18 |
| 27 | 6 | 5.9 | 179 | 175.4 | 1.67 | 2.01 | 1.39 |
| 28 | 6 | 5.9 | 185 | 181.3 | 1.67 | 2.00 | 1.60 |
| 29 | 7 | 6.9 | 192 | 188.2 | 1.43 | 1.98 | 1.81 |
| 30 | 7 | 6.8 | 199 | 195 | 2.86 | 2.01 | 2.02 |
| 31 | 6 | 5.9 | 205 | 200.9 | 1.67 | 2.00 | 2.02 |

Thirty-one intervals of operation for a hypothetical refining process which exhibits a high degree of operational instability are presented in Table I. The net amounts of unrefined and refined fluid for each interval of operation are given in the second and third columns. The cumulative net amounts of unrefined and refined fluid are given in the fourth and fifth columns. Table I demonstrates that the cumulative net amounts of unrefined and refined fluid for each interval of operation comprise the sum of net amounts of unrefined and refined fluid for all intervals of operation prior to and including the interval of operation under consideration.

Several series of percentage intermittent losses are given in Table I. A series of percentage intermittent losses determined in accordance with the prior art is presented in column X. In column X the percentage intermittent loss for each interval of operation is obtained by subtracting the net amount of refined fluid from the net amount of unrefined fluid and dividing the difference by the net amount of unrefined fluid which are shown for the interval of operation under consideration. The elements of the series can vary drastically from one interval of operation to another.

A series of percentage intermittent losses determined in accordance with the present invention for the case where the operator enters zero in sample number selector 57 (FIG. 3) is presented in column Y. In column Y the percentage intermittent loss for each interval of operation is obtained by subtracting the cumulative net amount of refined fluid from the cumulative net amount of unrefined fluid and dividing the difference by the cumulative net amount of unrefined fluid which are shown for the interval of operation under consideration. In contrast to the elements of the prior art series in column X, the elements of the series in column Y do not vary so drastically from one interval of operation to another. Thus, the series in column Y facilitates monitoring of the refining process by supervising personnel.

A series of percentage intermittent losses determined in accordance with the present invention for the case where the operator enters five in sample number selector 57 (FIG. 3) is presented in column Z. In column Z the percentage intermittent loss is correlated to the cumulative net amounts of unrefined and refined fluid and the number entered by the operator, in this case five. Each element in column Z has been obtained as described in detail above.

The series of percentage intermittent losses in column X determined in accordance with the prior art shows the instability of the refining process to a greater extent than the series of percentage intermittent losses in either column Y or column Z determined in accordance with the present invention. In column X the percentage intermittent loss for each interval of operation reflects any surge which occurred during the interval of operation. In column Y and column Z the percentage intermittent loss for each interval of operation is based on cumulative net amounts of fluid and, therefore, is not affected to as significant a degree by a surge which occurred during the interval of operation. In this same context each percentage intermittent loss in column X relates to a distinct interval of operation and, therefore, does not relate to a period of operation longer than one interval of operation. Because each percentage intermittent loss in column Y and column Z is based on cumulative net amounts of fluid, each percentage intermittent loss in column Y and column Z does relate to a history of operation or period of operation longer than one interval of operation. Since surges in operation are de-emphasized and since a history of operation is reflected by the series of percentage intermittent losses in column Y and column Z, personnel can more easily monitor the refining process.

To further smooth sudden disturbances and to average changes in operation and, thus, emphasize trends in such changes in operation, the monitoring system of the present invention permits the operator to enter a number greater than zero in sample number selector 57 (FIG. 3). As described above, column Y represents the case where zero has been chosen as the number of computations or statistical samples and column Z represents the case where five has been chosen as the number of computations or statistical samples.

Referring to column Y and column Z of Table I, in column Y the percentage intermittent loss for each interval of operation equals what has been referred to above as the current percentage loss and in column Z the percentage intermittent loss for each interval of operation corresponds to what has been referred to above as the reference percentage loss. At the end of the initialization phase represented by interval 1 in Table I the reference percentage loss is equal to the current percentage loss.

The result of the smoothing technique of the monitoring system is best observed by considering intervals 25 to 30. Between steps 25 and 26 in column Y the loss jumps from 1.19% to 2.02%. Thereafter, the loss remains level at approximately 2.0%. At step 25 in column Z the loss is 0.98%. The difference between the current percentage loss at step 26 in column Y and the reference percentage loss at step 25 in column Z is 1.04%. Since the number of computations or statistical samples for column Z is five, the change represented by the jump in the loss at step 26 in column Y is smoothed over five intervals. Thus, the 1.04% difference is divided by five giving what has been referred to above as the loss increment of 0.21%. The reference percentage loss is incremented at the rate of 0.21% an interval until the intermittent losses in column Y and column Z converge at the end of five intervals at interval 30.

The above technique of smoothing fluctuations in operation is used even where the loss does not become level as shown for the final intervals of column Y and column Z in Table I. The intermittent losses as shown in column Z off Table I exhibit less change than those in column Y. Moreover, as the number of samples becomes larger, less change in the intermittent loss occurs between intervals for a given change in operation of the refining process. For example, although the loss in column Y in Table I shows a gain at intervals 17 and 18, no where in column Z is such a gain apparent. Thus, unstable refining processes can be more easily monitored.

The series of intermittent losses in Table I are graphed in FIG. 7. The graph for column Y or column Z is representative of what might appear on the chart of strip chart recorder 59 (FIG. 3). The graphs of column Y and column Z determined in accordance with the present invention are superior to the graph of column X determined in accordance with the prior art since the graphs in column Y and column Z provide data which is much more meaningful to personnel for monitoring the refining process, for example, determining when a parameter must be adjusted.

In the preferred embodiment of the monitoring system of the present invention, after net amounts of unrefined, refined, and finished fluid have been computed, they are used to update one set of totalizing registers, one set of accumulating registers, and one set of batch registers. As described above, data in the totalizing registers is used to compute overall loss. Data in the accumulating registers is used to compute intermittent losses. The use of data in the batch registers will be described below. According to the preferred embodiment data in only a single set of registers, such as registers 285 and 296 in FIG. 5C, is needed to compute intermittent losses.

According to a second embodiment, the monitoring system of the present invention permits the operator to enter a number in sample number selector 57 (FIG. 3) to select a corresponding number of discrete net amounts of unrefined and refined fluid the sums of which determine what has been referred to above as the cumulative net amounts of unrefined and refined fluid, respectively, used to determine intermittent losses. In the preferred embodiment the cumulative net fluid amounts used to determine intermittent losses represent the sum of all net fluid amounts for all intervals of operation from the time that monitoring is first begun. In contrast, in the second embodiment the cumulative net fluid amounts used to determine intermittent losses represent the sum of net fluid amounts for a predetermined number of intervals of operation for a period of operation corresponding in length to the predetermined number of intervals of operation. If the operator selects, for example, forty as the number of statistical samples, the most recent forty net fluid amounts are summed to determine cumulative net fluid amounts. The only significant advantages which the preferred embodiment has over the second embodiment are that recirculating shift registers are required and the number of arithmetic operations performed by the monitoring system to compute intermittent losses increases if the second embodiment is used. In addition, the number of statistical samples must be greater than zero, or the intermittent losses will be the same as intermittent losses determined in accordance with the prior art.

In accordance with the second embodiment, FIG. 6C should be substituted for FIG. 5C. Referring to FIG. 6C, the net amount of unrefined fluid from AND gate 281 is input to unrefined fluid sample recirculating shift register 434. The net amount of refined fluid from AND gate 435 is input to refined fluid sample recirculating shift register 436. The length of recirculating shift registers 434 and 436 is selected by the operator by entry of a number in sample number selector 57. Thus, the operator selects the number of intervals of operation of the refining process for which net amounts of unrefined and refined fluid are stored in recirculating shift registers 434 and 436. After recirculating shift registers 434 and 436 are once filled with unrefined and refined net fluid amount samples, subsequent samples replace the samples longest retained in recirculating shift registers 434 and 436 as in a first-in-first-out data system.

In accordance with the second embodiment, the net amounts of unrefined fluid in recirculating shift register 434 are summed in summer 437 and entered in cumulative net unrefined register 285. The net amounts of refined fluid in recirculating shift register 436 are summed in summer 439 and entered in cumulative net refined register 296. In the second embodiment the sums in registers 285 and 296 are used as cumulative net amounts of unrefined and refined fluid, respectively, to compute intermittent losses as described in detail above in connection with FIG. 5D.

Although the series of intermittent losses described above is used to monitor the refining process, a series of intermittent losses could also have been generated to monitor the finishing process. Whereas cumulative net amounts of unrefined and refined fluid are used to determine the series of intermittent losses for the refining process, cumulative net amounts of refined and finished fluid could be used to determine the series of intermittent losses for the finishing process and personnel could thus monitor losses due to removal of (a) air entrained or dissolved in the vegetable oil, (b) volatiles in the vegetable oil, and (c) vegetable oil vapor by vacuum dryer 21 (FIG. 1) during the finishing process. In fact a series of intermittent losses between any two flow meter stations along a fluid flow system could be generated in accordance with the principles of the present invention.

The smoothing technique of the monitoring system of the present invention has been described above in connection with generating a series of intermittent losses between any two flow meter stations along a fluid flow system. The smoothing technique, however, also permits adjustment of flow through a flow meter station to a desired value or to determine average flow or deviation from a desired flow particularly in fluid flow systems with fluctuating or surging conditions. The only required modification would be a substitution for one of the cumulative net amounts used to determine the series of intermittent losses. In FIG. 1, for example, flow meter 11 could be disconnected from pulse generator 25. Pulse generator 25 could then be driven by a motor at a predetermined rate to simulate a desired flow condition. A series of intermittent losses between unrefined and refined flow meter stations would reveal surges in operation of the refining process and flow through the refined flow meter station could be adjusted to stabilize operation.

Referring again to FIG. 4C, if the cumulative net amount of unrefined fluid does not exceed the minimum unrefined sample size or after data from an intermittent loss computation cycle is input to strip chart recorder 59 (FIG. 3), as indicated by machine function 160 or 178, respectively, the monitoring system at machine function 179 determines whether or not the monitoring system reset flag is set. If machine function 179 indicates that the monitoring system reset flag is set, the monitoring system calculates the batch loss based on the batch net amounts of unrefined and finished fluid as indicated by machine function 182 (FIG. 4D).

The monitoring system then enters the batch loss and batch net amounts of unrefined, refined, and finished fluid in the printer message file as indicated by machine functions 183 and 184 and resets the batch net unrefined, refined, and finished registers to zero as indicated by machine function 185. The monitoring system also resets the monitoring system reset flag as indicated by machine function 186.

Referring to FIG. 5D, the operator sets monitoring system reset flag 386 when he depresses reset printout command switch 71. If monitoring system reset flag 386 is set, a signal from monitoring system reset flag 386 is input to AND gate 387. The signal from monitoring system reset flag 386 and a signal from sequence controller 200 enable AND gate 387. A signal from AND gate 387 is input to AND gates 389, 390, 391, and 392.

Subtractor 393 generates the difference between the batch net amounts of unrefined and finished fluid in registers 441 and 302 (FIG. 5C). The difference in subtractor 393 enters divider 394. The batch net amount of unrefined fluid in register 441 (FIG. 5C) also enters divider 394. Divider 394 generates the batch loss as a percentage of batch net unrefined fluid which is input to AND gate 389.

The signal from AND gate 387 gates the batch loss via AND gate 389 to printer message file 218 (FIG. 5A). Together with the signal from AND gate 387, subsequent signals from sequence controller 200 sequentially enable AND gates 390, 391, and 392. Signals from AND gates 390, 391, and 392 are sequentially input to AND gate 395 and AND gate 396 in FIG. 5D and AND gate 397 in FIG. 5C, respectively.

The signal from AND gate 392 gates the batch net amount of unrefined fluid via AND gate 395 to printer message file 218 (FIG. 5A). The signal from AND gate 391 gates the batch net amount of refined fluid via AND gate 396 to printer message file 218 (FIG. 5A). The signal from AND gate 390 gates the batch net amount of finished fluid via AND gate 397 (FIG. 5C) to printer message file 218 (FIG. 5A).

A signal from sequence controller 200 and the signal from AND gate 387 enable AND gate 398. A signal from AND gate 398 is input to AND gate 399 (FIG. 5C). The signal from AND gate 398 gates zero via AND gate 399 (FIG. 5C) and OR gates 275, 432, and 433 in FIG. 5C to batch net unrefined, refined, and finished registers 441, 442, and 302 in FIG. 5C, respectively. The signal from AND gate 398 also resets monitoring system reset flag 386.

Referring to FIGS. 4C and 4D, if machine function 179 indicates that the monitoring system reset flag is not set or after the reset sequence described immediately above, the monitoring system determines whether or not the operator has requested a manual data entry as indicated by machine function 187. If machine function 187 indicates that the manual data entry flag is set, the monitoring system resets the manual data entry flag and reads the manually entered data as indicated by machine functions 188 and 189, respectively.

Manual entry of data into appropriate registers in FIG. 5 is analogous to manual entry of the time of day by a procedure described above. Thus, manual data entry involves use of display select switch 62, data switches 61, manual data entry registers 75, data entry switch 73, and data input key 76. In view of the fact that the logic circuitry connected to the various elements duplicates logic circuitry considered in the description of entry of the time of day, further description of manual data entry at this point is omitted.

Returning to FIG. 4D, if machine function 187 indicates that the manual data entry flag is not set, the monitoring system proceeds to the printout sequence which will be described below. On the other hand, after a manual data entry as indicated by machine function 189, the monitoring system determines whether or not the prove flag is set as indicated by machine function 190. If machine function 190 indicates that the prove flag is set, a determination is made as indicated by machine function 191 whether or not the prove cycle flag is set.

During the first prove cycle the prove cycle flag will not be set. The monitoring system, therefore, sets the prove cycle flag, reads master flow meter data, sets the correlation factors for the other flow meters at unity, reads a known refinery loss, and computes an offset from the known refinery loss as indicated by machine functions 192, 193, 194, 195, and 196, respectively.

During the subsequent prove cycle machine function 191 will indicate that the prove cycle flag is set. The monitoring system resets the prove flag as indicated by machine function 197. The monitoring system also resets the prove cycle flag as indicated by machine function 197a.

The monitoring system then determines whether or not the unrefined flow meter is the master flow meter as indicated by machine function 198. If machine function 198 indicates that the unrefined flow meter is the master flow meter, new correlation factors for the refined and finished flow meters are calculated as indicated by machine functions 199 and 221. If the unrefined flow meter is not the master flow meter, the monitoring system determines whether the refined or finished flow meter is the master flow meter as indicated by machine function 222. If the refined flow meter is the master, new correlation factors for the unrefined and finished flow meters are calculated as indicated by machine functions 223 and 224. If, on the other hand, the finished flow meter is the master flow meter, new correlation factors for the unrefined and refined flow meters are calculated as indicated by machine functions 225 and 226.

Referring to FIG. 5E, the operator sets prove flag 400 when he depresses prove selector 66. When prove flag 400 is set, a signal from prove flag 400 is input to AND gate 401. Prove cycle flag 402 is not set at the time that the operator depresses prove selector 66. Consequently, a signal from prove cycle flag 402 is input to AND gate 401. A signal from sequence controller 200 is also input to AND gate 401. AND gate 401 is enabled and a signal from gate 401 sets prove cycle flag 402. The signal from AND gate 401 is also input to AND gates 403 through 408.

The operator selects the master flow meter by actuating either unrefined master switch 80, refined master switch 81, or finished master switch 82, thereby setting one of unrefined, refined, or finished master flow meter flags 409, 410, or 411. The operator also enters a correlation factor for the master flow meter in manual data entry registers 75.

If the unrefined flow meter is selected as the master, a signal from unrefined master flag 409 gates the flow meter correlation factor in manual data entry registers 75 via AND gate 403 to unrefined flow meter correlation factor register 210 (FIG. 5A). Similarly, if either the refined or finished flow meter is selected as the master, either refined master flag 410 or finished master flag 411 gates the master flow meter correlation factor in manual data entry registers 75 via either AND gate 404 or AND gate 405 to either unrefined flow meter correlation factor register 212 (FIG. 5A) or finished flow meter correlation factor register 214 (FIG. 5A).

If unrefined master flag 409 is not set, a signal from unrefined master flag 409 is input to AND gate 406. Similarly, if refined master flag 410 is not set, a signal from refined master flag 410 is input to AND gate 407. Finally, if finished master flag 411 is not set, a signal from finished master flag 411 is input to AND gate 408. The signal from AND gate 401 and the signals from the two master flow meter flags which are not set gate unity via the AND gates with which they are associated to the appropriate flow meter correlation factor registers in FIG. 5A.

A known refinery loss, for example, a loss determined by laboratory analysis, which is entered by the operator in manual data entry registers 75, enters subtractor 412 where it is subtracted from the reference percentage loss which enters subtractor 412 from register 347 (FIG. 5D). The signal from AND gate 401 and a signal from sequence controller 200 gate the difference in subtractor 412 via AND gate 413 to offset register 414.

During the subsequent cycle signals indicating that prove flag 400 and prove cycle flag 402 are set and a signal from sequence controller 200 enable AND gate 415. A signal from AND gate 415 resets prove flag 400 and prove cycle flag 402.

The monitoring system then proceeds to calculate new correlation factors for the flow meters which are not selected as the master flow meter. Since calculation of the correlation factors for the flow meters which are not selected as the master flow meter is similar, whether the unrefined, refined, or finished flow meter is selected as the master flow meter, for the purpose of this description only the case where the unrefined flow meter is the master flow meter will be described.

In the illustrative case where the unrefined flow meter is the master flow meter, signals from AND gate 415 and unrefined master flag 409 enable AND gate 416. A signal from AND gate 416 is input to AND gate 417. The signal from AND gate 416 is also input via OR gate 418 to AND gate 419 and via OR gate 420 to AND gate 421. Together with the signal from AND gate 416, a signal from sequence controller 200 via OR gate 422 gates the net amount of unrefined fluid from register 282 (FIG. 5C) via AND gate 417 and OR gate 423 to divider 424. The signal from sequence controller 200 and the signal from OR gate 418 enable AND gate 419. Consequently, a signal from AND gate 419 gates the net amount of refined fluid in register 295 (FIG. 5C) via AND gate 425 and OR gate 426 to divider 424. Divider 424 divides the net amount of unrefined fluid by the net amount of refined fluid and the result enters subtractor 427. Subtractor 427 subtracts the offset in offset register 414 from the result of the division in divider 424, and the difference is input to AND gate 428. The signal from AND gate 419 gates the difference from subtractor 427 via AND gate 428 to refined flow meter correlation factor register 212 (FIG. 5A).

Together with the signal from AND gate 416, a subsequent signal from sequence controller 200 via OR gate 422 gates the net amount of unrefined fluid in register 282 (FIG. 5C) via AND gate 417 and OR gate 423 to divider 424. This subsequent signal from sequence controller 200 and the signal from OR gate 420 enable AND gate 421. Consequently, a signal from AND gate 421 gates the net amount of finished fluid in register 301 (FIG. 5C) via AND gate 429 and OR gate 426 to divider 424. Divider 424 divides the net amount of unrefined fluid by the net amount of finished fluid and enters the result in subtractor 427. Subtractor 427 subtracts the offset in offset register 414 from the result of the division in divider 424 and the difference in input to AND gate 430. The signal from AND gate 421 gates the difference in subtractor 427 via AND gate 430 to finished flow meter correlation factor register 214 (FIG. 5A).

The prove described immediately above produces new flow meter correlation factors which are used in subsequent net fluid amount computations. The prove serves to correlate the two flow meters which are not selected as master to the master flow meter.

The prove also provides an alternative to the methods of calibration which are disclosed in the prior art. The monitoring system of the present invention facilitates calibration during actual operation of the fluid flow system based on entry of (a) a known loss which is determined, for example, from laboratory tests and (b) an actual calibration for the flow meter which is selected as the master. This essentially means that the operator needs to calibrate only the master flow meter, for example, he may flow a known amount of fluid through the master flow meter to obtain a calibration. The monitoring system then calibrates the other two flow meters based on the known loss and the master flow meter calibration.

Referring to FIG. 4, if machine function 113 indicates that the real time clock flag is not set, if machine function 187 indicates that the operator has not selected a manual data entry, or machine function 191 indicates that the operator has not selected a prove, the monitoring system proceeds to machine function 227. The monitoring system also proceeds to machine function 227 after step 196, 221, 224, or 226 involving various flow meter correlation factor calculations during a prove cycle.

At machine function 227 the monitoring system determines whether or not any data has accumulated in the printer message file. If machine function 227 indicates that no data is present in the printer message file, the monitoring system proceeds to machine function 109 and initiates another monitoring cycle. If machine function 227 indicates that data is present in the printer message file, the monitoring system prints the data as indicated by machine function 228. After data is printed, the monitoring system proceeds to step 109 where another monitoring cycle is commenced. As shown in FIG. 5A, if any data is present in printer message file 218, a signal from sequence controller 200 gates the data via AND gate 431 to printer 65.

Although the monitoring system of the present invention has been described in connection with arithmetic and logic circuitry in the schematic diagram of FIG. 5, a general purpose digital computer may be programmed to carry out the steps of the operational flow diagram of FIG. 4. The use of a general purpose digital computer in lieu of the hard-wired logic and arithmetic circuitry of FIG. 5 would add flexibility to the monitoring system. For example, with the addition of a flow meter and temperature transducer for water introduced to the refining process and the addition of a flow meter, a temperature transducer, and moisture content transducer for lye introduced to the refining process, the general purpose digital computer could be easily programmed to calculate information such as the unrefined fluid to water ratio and the unrefined fluid to lye ratio. Such information would further aid the operator in adjusting the addition of materials to produce a more efficient refining process.

Having described the invention, we claim:

1. Apparatus for monitoring losses in a fluid flow system, such as a refinery or pipeline, comprising:

at least two measurement stations located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, sample number selector means for entering a preselected number, and a loss indicator associated with said at least two measurement stations, memory means, and sample number selector means, said loss indicator including (a) net fluid calculation means responsive to said data and information for calculating a net amount of fluid which has flowed past each of said at least two measurement stations during each interval of said series of intervals of operation, (b) current loss calculation means for subtracting said net amount of fluid for a first of said at least two measurement stations from said net amount of fluid for a second of said at least two measurement stations to signify a current loss for each interval of said series of intervals of operation, (c) a flag having a reset condition when said current loss relates to a first interval of operation and a set condition when said currrent loss relates to subsequent intervals of operation, (d) first means under control of said flag when said flag is in said reset condition for entering said current loss as a reference loss, (e) second means under control of said flag when said flag is in said reset condition for setting said flag, (f) third means under control of said flag when said flag is in said reset condition for entering the quantity zero as a reference increment, (g) fourth means responsive to said preselected number and under control of said flag when said flag is in said set condition for determining when said preselected number is zero and non-zero, (h) fifth means under control of said fourth means when said preselected number is zero for entering said current loss as said reference loss, (i) current increment calculation means under control of said fourth means when said preselected number is non-zero for dividing said current loss by said preselected number to signify a current increment, (j) first decision means responsive to said current increment for determining when said current increment has a different polarity than said reference increment, (k) second decision means responsive to said current increment for determining when said current increment has a greater magnitude than said reference increment, (l) third decision means responsive to said current increment for determining when said current increment is zero, (m) sixth means under control of said decision means for entering said current increment as said reference increment when said polarity is different, when said magnitude is greater, and when said current increment is zero, (n) loss indication calculation means for adding said reference increment and said reference loss to signify a loss indication, and (o) means for displaying said loss indiction, said loss indicator for distributing a surge in the operation of said fluid flow system which occurs during any of said subsequent intervals of operation over a number of intervals of operation equal to said preselected number so as to smooth each said surge over a series of loss indications.

2. Apparatus for monitoring losses in a fluid flow system, such as refinery or pipeline, comprising:

at least two measurement stations located at separate positions along a fluid flow path, each said measurement station having (a) means for measuring a gross fluid amount flowing past said each measurement station during each interval of a series of intervals of operation of said fluid flow system, (b) means for measuring a temperature of fluid at said each measurement station during said each interval, and (c) means for measuring a moisture content of fluid at said each measurement station during said each interval, memory means for storing correlation factors for said gross fluid amount measuring means and a temperature coefficient of expansion factor for said fluid, sample number selector means for entering a preselected non-zero number, net fluid calculation means responsive to said gross fluid amount, temperature, and moisture content measurements and said correlation and temperature coefficient of expansion factors for calculating a net amount of fluid which has flowed past each of said at least two measurement stations during each interval of said series of intervals of operation, current loss calculation means for subtracting said net amount of fluid for a first of said at least two measurement stations from said net amount of fluid for a second of said at least two measurement stations to signify a current loss when said net amount of fluid for said second measurement station exceeds a predetermined minimum sample amount, first means for entering said current loss as a reference loss during a first interval of operation, said reference loss signifying a loss indication for said first interval of operation, increment calculation means responsive to said preselected number for dividing said current loss by said preselected number to signify an increment during subsequent intervals of operation, loss indication calculation means for adding said increment to said reference loss during said subsequent intervals of operation to signify a loss indication for each of said subsequent intervals of operation, and means for displaying said loss indications, whereby a surge in the operation of said fluid flow system which occurs during any of said subsequent intervals of operation is distributed over a number of intervals of operation equal to said preselected number so as to smooth each said surge over a series of loss indications.

3. Apparatus for monitoring losses in a fluid flow system, such as a refinery or pipeline, comprising:

at least two measurement stations located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, sample number selector means for entering a preselected non-zero number, net fluid calculation means responsive to said data and information for calculating a net amount of fluid which has flowed past each of said at least two measurement stations during each interval of said series of intervals of operation, current loss calculation means for subtracting said net amount of fluid for a first of said at least two measurement stations from said net amount of fluid for a second of said at least two measurement stations to signify a current loss when said net amount of fluid for said second measurement station exceeds a predetermined minimum sample amount, first means for entering said current loss as a reference loss during a first interval of operation, said reference loss signifying a loss indication for said first interval of operation, increment calculation means responsive to said preselected number for dividing said current loss by said preselected number to signify an increment during subsequent intervals of operation, loss indication calculation means for adding said increment to said reference loss during said subsequent intervals of operation to signify a loss indication for each of said subsequent intervals of operation, and means for displaying said loss indications, whereby a surge in the operation of said fluid flow system which occurs during any of said subsequent intervals of operation is distributed over a number of intervals of operation equal to said preselected number so as to smooth each said surge over a series of loss indications.

4. Apparatus for monitoring deviation in the amount of fluid flow in a fluid flow system, such as a refinery or pipeline, which is susceptible to surges in the amount of fluid flow, comprising:

at least one measurement station along a fluid flow path having means for measuring data related to fluid flowing through said fluid path during a series of intervals of operation of said fluid flow system, said data including a gross amount of said fluid which has flowed past said at least one measurement station during each interval of said series of intervals of operation, signal generating means for generating signals at a preselected rate, the number of said signals during a period of time corresponding to a predetermined amount of fluid, memory means for storing information related to accuracy of operation of said data measuring means and information related to physical properties of said fluid, sample number selector means for entering a preselected non-zero number, net fluid calculation means responsive to said data and information for calculating a net amount of fluid which has flowed past said at least one measurement station during each interval of said series of intervals of operation, current difference calculation means responsive to said signals for subtracting said net amount of fluid for said at least one measurement station from said predetermined amount of fluid corresponding to said number of signals to signify a current difference, first means for entering said current difference as a reference difference during a first interval of operation, said reference difference signifying an indication of deviation of said net amount of fluid from said amount of fluid corresponding to said number of signals during a first interval of operation, increment calculation means responsive to said preselected number for dividing said current difference by said preselected number to signify an increment during subsequent intervals of operation, deviation calculation means for adding said increment to said reference difference during said subsequent intervals of operation to signify an indication of deviation of said net amount of fluid from said predetermined amount of fluid during each of said subsequent intervals of operation, and means for displaying said indications of deviation, whereby a surge in the operation of said fluid flow system which occurs during any of said subsequent intervals of operation is distributed over a number of intervals of operation equal to said preselected number so as to smooth each said surge over a series of indications of deviation.

5. A method for monitoring losses in a fluid flow system, such a a refinery or pipeline, including the steps of:
   measuring data related to fluid flowing through a fluid flow path at a plurality of measurement stations located at separate positions along the fluid flow path during a series of intervals of operation of the fluid flow system, the data including a gross amount of fluid which has flowed past each measurement station during each interval of the series of intervals of operation,
   storing information related to accuracy of operation of the measurement stations and information related to physical properties of the fluid,
   entering a selectable non-zero number by means of a sample number selector,
   calculating a net amount of fluid which has flowed past at least two measurement stations during each interval of the series of intervals of operation based on the data and information,
   subtracting the net amount of fluid for a first of the two measurement stations from the net amount of fluid for a second of the two measurement stations to signify a current loss when the net amount of fluid for the second measurement station exceeds a predetermined minimum sample amount,
   entering the current loss as a reference loss during a first interval of operation, the reference loss signifying a loss indication for the first interval of operation,
   dividing the current loss by the preselected number to signify an increment during subsequent intervals of operation,
   adding the increment to the reference loss during the subsequent intervals of operation to signify a loss indication for each of the subsequent intervals of operation,
   displaying the loss indication for the first interval of operation by a display means, and
   updating the display means to the loss indication for each of the subsequent intervals of operation,
   thereby distributing a surge in the operation of the fluid flow system which occurs during any of the subsequent intervals of operation over a number of intervals of operation equal to the selectable number so as to smooth each surge over a series of loss indications.

6. A method for monitoring deviation in the amount of fluid flow in a fluid flow system, such as a refinery or pipeline, which is susceptible to surges in the amount of fluid flow, including the steps of:
   measuring data related to fluid flowing through a fluid flow path at a measurement station along the fluid flow path during a series of intervals of operation of the fluid flow system, the data including a gross amount of fluid which has flowed past the measurement station during each interval of the series of intervals of operation,
   generating signals at a preselected rate, the number of the signals during a period of time corresponding to a predetermined amount of fluid,
   storing information related to accuracy of operation of the measurement station and information related to physical properties of the fluid,
   entering a selectable non-zero number by means of a sample number selector,
   calculating a net amount of fluid which has flowed past the measurement station during each interval of the series of intervals of operation,
   subtracting the net amount of fluid for the measurement station from the predetermined amount of fluid corresponding to the number of signals to signify a current difference,
   entering the current difference as a reference difference during a first interval of operation, the reference difference signifying an indication of deviation of the net amount of fluid from the amount of fluid corresponding to the number of signals during a first interval of operation,
   dividing the current difference by the preselected number to signify an increment during subsequent intervals of operation,
   adding the increment to the reference difference during the subsequent intervals of operation to signify a subsequent indication of deviation of the net amount of fluid from the predetermined amount of fluid during each of the subsequent intervals of operation,
   displaying the indication of deviation for the first interval of operation by a display means, and
   updating the display means to the indication of deviation for each of the subsequent intervals of operation,
   thereby distributing a surge in the operation of the fluid flow system which occurs during any of the subsequent intervals of operation over a number of intervals of operation equal to the selectable number so as to smooth each surge over a series of indications of deviation.

7. Apparatus for monitoring losses in a fluid flow system, such as a refinery or pipeline, comprising:
   at least two measurement stations, including an input measurement station and an output measurement station, located at separate positions along a fluid flow path, each said measurement station having means for measuring data related to fluid flowing through said fluid flow path at said separate positions during a series of intervals of operation of said fluid flow system,
   said data including a gross amount of fluid which has flowed past each said measurement station during each interval of said series of intervals of operation,
   memory means for storing information related to accuracy of operation of said data measuring means and information related to physical properties of said fluid,
   detector means for producing a signal when fluid to be output from said fluid flow path exceeds a predetermined amount,
   clock means for measuring a time related to a period of operation of said fluid flow system,
   time delay means for entering a time delay, and
   an overall loss indicator associated with said input and output measurement stations, memory means, and clock means and under control of said detector means and time delay means, said overall loss indicator including
   (a) net fluid calculating means responsive to said data and information for calculating a net amount of fluid which has flowed past each of said input and output measurement stations during each interval of said series of intervals of operation, (b) a first flag responsive to said signal having a reset condition when said signal is not present and a set condition when said signal is present, (c) first means under control of said first flag when said first flag is in said set condition for resetting said first flag, (d) a second flag having a reset condition prior to a first interval of operation during which said signal appears and a set condition during subsequent intervals of operation, (e) totalizing means under control of said second flag when said second flag is in said set condition for summing said net amounts of fluid for each of said input and output measurement stations for said series of intervals of operation to signify total net amounts of fluid, (f) second means under control of said flags when said first flag is in said set condition and said second flag is in said reset condition for entering the quantity zero as said time, (g) third means under control of said flags when said first flag is in said set condition and said second flag is in set reset condition for entering the quantity zero as said total net amounts of fluid, (h) fourth means under control of said flags when said first flag is in said set condition and said second flag is in said reset condition for setting said second flag during said first interval of operation, (i) decision means responsive to said time and said time delay and under control of said flags when said flags are in said set condition for determining when said time exceeds said time delay, and (j) overall loss calculation means under control of said decision means when said time exceeds said time delay for subtracting said total net amount of fluid for said output measurement station from said total net amount of fluid for said input measurement station when said signal is present to provide an indication of overall loss, whereby said detector means initiates calculation of said overall loss between said input and output measurement stations after a period of time longer than said time delay.

8. Apparatus for monitoring losses in a fluid flow system, such as a refinery or pipeline, comprising:

at least two measurement stations, including an input measurement station and an output measurement station, located at separate positions along a fluid flow path, each said measurement station having (a) means for measuring a gross fluid amount flowing past said each measurement station during each interval of a series of intervals of operation of said fluid flow system, (b) means for measuring a temperature of fluid at said each measurement station during said each interval, and (c) means for measuring a moisture content of fluid at said each measurement station during said each interval, memory means for storing correlation factors for said gross fluid amount measuring means and a temperature coefficient of expansion factor for said fluid, detector means for producing a signal when fluid to be output from said fluid flow path exceeds a predetermined amount, resettable clock means for measuring a time related to a period of operation of said fluid flow system, time delay means for entering a preselected time delay, net fluid calculation means responsive to said gross fluid amount, temperature, and moisture content measurements and said correlation and temperature coefficient of expansion factors for calculating a net amount of fluid which has flowed past each of said input and output measurement stations during each interval of said series of intervals of operation, first means for resetting said clock means during a first interval of operation during which said signal appears, totalizing means for summing said net amounts of fluid for each of said input and output measurement stations to signify total net amounts of fluid during intervals of operation subsequent to said first interval, decision means responsive to said time and said time delay for determining when said time exceeds said time delay, and overall loss calculation means under control of said decision means when said time exceeds said time delay for subtracting said total net amount of fluid for said output measurement station from said total net amount of fluid for said input measurement station when said signal is present to provide an indication of overall loss, whereby said detector means initiates calculation of said overall loss between said input and output measurement stations after a period of time longer than said time delay.

9. Apparatus for monitoring losses in a fluid flow system, such as a refinery or pipeline, comprising:

at least two measurement stations, including an input measurement station and an output measurement station, located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, detector means for producing a signal when fluid to be output from said fluid flow path exceeds a predetermined amount, resettable clock means for measuring a time related to a period of operation of said fluid flow system, time delay means for entering a preselected time delay, net fluid calculation means responsive to said data and information for calculating a net amount of fluid which has flowed past each of said input and output measurement stations during each interval of said series of intervals of operation, first means for resetting said clock means during a first interval of operation during which said signal appears, totalizing means for summing said net amounts of fluid for each of said input and output measurement stations to signify total net amounts of fluid during intervals of operation subsequent to said first interval, decision means responsive to said time and said time delay for determining when said time exceeds said time delay, and overall loss calculation means under control of said decision means when said time exceeds said time delay for subtracting said total net amount of fluid for said output measurement station from said total net amount of fluid for said input measurement station when said signal is present to provide an indication of overall loss, whereby said detector means initiates calculation of said overall loss between said input and output measurement stations after a period of time longer than said time delay.

10. A method for monitoring losses in a fluid flow system, such as a refinery or pipeline, including the steps of:

measuring data related to fluid flowing through a fluid flow path at a plurality of measurement stations, including an input measurement station and an output measurement station, located at separate positions along the fluid flow path during a series of intervals of operation of the fluid flow system, the data including a gross amount of fluid which has flowed past each measurement station during each interval of the series of intervals of operation, storing information related to accuracy of operation of the measurement stations and information related to physical properties of the fluid, producing a signal when fluid to be output from the fluid flow path exceeds a predetermined amount, measuring a time related to a period of operation of the fluid flow system by means of a resettable clock, entering a preselected time delay, calculating a net amount of fluid which has flowed past each of the input and output measurement stations during each interval of the series of intervals of operation based on the data and information, resetting the clock during a first interval of operation during which the signal appears, summing the net amounts of fluid for each of the input and output measurement stations to signify total net amounts of fluid during intervals of operation subsequent to the first interval, determining when the time exceeds the time delay, and subtracting the total net amount of fluid for the output measurement station from the total net amount of fluid for the input measurement station when the time exceeds the time delay and the signal is present to provide an indication of overall loss, thereby initiating calculation of the overall loss between the input and output measurement stations when fluid to be output from the fluid flow path exceeds a predetermined amount and after a period of time longer than the time delay.

11. Apparatus for correlating measuring devices used to monitor losses in a fluid flow system, such as a refinery or pipeline, comprising:

at least two measurement stations located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, means for selecting one of said data measuring means as a master, means for entering different information related to accuracy of operation of said master, means for entering a known loss, and a processor associated with said at least two measurement stations, memory means, master selection means, master information entry means, and known loss entry means, said processor including (a) a flag having a reset condition prior to a first interval of operation and a set condition during a subsequent interval of operation, (b) first means under control of said flag when said flag is in said reset condition for setting said flag during said first interval of operation, (c) second means responsive to said different information and under control of said master selection means for changing said accuracy information for said master to said different information, (d) third means under control of said master selection means for changing said accuracy information for said other data generating means to unity, (e) fourth means responsive to said known loss for subtracting said known loss from an indicated loss to signify an offset, (f) fluid amount calculation means responsive to said data and information, including said different information and said unity accuracy information for calculating an amount of fluid which has flowed past each of said at least two measurement stations during said subsequent interval of operation, (g) correlation factor calculation means responsive to said calculated amounts of fluid and said offset for calculating update accuracy information for said other data measuring means, and (h) fifth means for changing said unity accuracy information for said other data measuring means to said update accuracy information, whereby said other data measuring means not selected as said master are correlated to said master during operation of said fluid flow system.

12. Apparatus for correlating measuring devices used to monitor losses in a fluid flow system, such as a refinery or pipeline, comprising:

at least two measurement stations located at separate positions along a fluid flow path, each said measurement station having (a) means for measuring a gross fluid amount flowing past said each measurement station during each interval of a series of intervals of operation of said fluid flow system, (b) means for measuring a temperature of fluid at said each measurement station during said each interval, and (c) means for measuring a moisture content of fluid at said each measurement station during said each interval, memory means for storing correlation factors for said gross fluid amount measuring means and a temperature coefficient of expansion factor for said fluid, means for selecting one of said gross fluid amount measuring means as a master, means for entering a known loss, first means responsive to said different correlation factor and under control of said master selection means for changing said correlation factor for said master to said different correlation factor, second means under control of said master selection means for changing said correlation factors for said other gross fluid amount measuring means to unity during a first interval of operation, third means responsive to said known loss for substracting said known loss from an indicated loss to signify an offset, fluid amount calculation means responsive to said gross fluid amount, temperature, and moisture content measurements, said different and unity correlation factors, and said temperature coefficient of expansion factor for calculating an amount of fluid which has flowed past each of said at least two measurement stations during a subsequent interval of operation, correlation factor calculation means responsive to said calculated amount of fluid and said offset for calculating update correlation factors for said other gross fluid amount measuring means, and fourth means for changing said unity correlation factors for said other gross fluid amount measuring means to said update correlation factors, whereby said other gross fluid amount measuring means not selected as said master are correlated to said master during operation of said fluid flow system.

13. Apparatus for correlating measuring devices used to monitor losses in a fluid flow system, such as a refinery or pipeline, comprising:

at least two measurement stations located at separate positions along a fluid flow path, each said measurement station having means for measuring data related to fluid flowing through said fluid flow path at said separate positions during a series of intervals of operation of said fluid flow system, said data including a gross amount of fluid which has flowed past each said measurement station during each interval of said series of intervals of operation, memory means for storing information related to accuracy of operation of said data measuring means and information related to physical properties of said fluid, means for selecting one of said data measuring means as a master, means for entering different information related to accuracy of operation of said master, means for entering a known loss, first means responsive to said different information and under control of said master selection means for changing said accuracy information for said master to said different information, second means under control of said master selection means for changing said accuracy information for said other data measuring means to unity during a first interval of operation, third means responsive to said known loss for subtracting said known loss from an indicated loss to signify an offset, fluid amount calculation means responsive to said data and information, including said different information and said unity accuracy information, for calculating an amount of fluid which has flowed past each of said at least two measurement stations during a subsequent interval of operation, correlation factor calculation means responsive to said calculated amounts of fluid and said offset for calculating update accuracy information for said other data measuring means, and fourth means for changing said unity accuracy information for said other data measuring means to said update accuracy information, whereby said other data measuring means not selected as said master are correlated to said master during operation of said fluid flow system.

14. A method for correlating measuring devices used to monitor losses in a fluid flow system, such as a refinery or pipeline, including the steps of:

measuring data related to fluid flowing through a fluid flow path at a plurality of measurement stations located at separate positions along the fluid flow path during a series of intervals of operation of the fluid flow system, the data including a gross amount of fluid which has flowed past each measurement station during each interval of the series of intervals of operation, storing information related to accuracy of operation of the measurement stations and information related to physical properties of the fluid, selecting one of the measurement stations as a master, entering different information related to accuracy of operation of the master, entering a known loss, changing the accuracy information for the master to the different information, changing the accuracy information for the other measurement stations to unity during a first interval of operation substracting the known loss from a loss indication to signify an offset, calculating an amount of fluid which has flowed past each of the measurement stations during a subsequent interval of operation based on the data and information, including the different information and unity accuracy information, calculating update accuracy information for the other measurement stations based on the calculated amounts of fluid and the offset, and changing the unity accuracy information for the other measurement stations to the update accuracy information, thereby correlating the other measurement stations not selected as the master to the master during operation of the fluid flow system.

* * * * *

UNITED STATES PATENT AND TRADEMARK OFFICE
CERTIFICATE OF CORRECTION

PATENT NO.  :   4,112,494
DATED       :   September 5, 1978
INVENTOR(S) :   Peter F. and Kenneth D. Elliott It is certified that error appears in the above-identified patent and that said Letters Patent are hereby corrected as shown below:

Col. 5 Line 33  "111"           should be --11--

Col. 9 Line 24  "wheter"        should be --whether--

Col. 9 Line 57  after "to be"   insert --smoothed or changes in operation of the fluid flow system are to be--

Col. 10 Line 25 "arranged"      should be --averaged--

Col. 11 Line 63 "data"          should be --day--

Col. 20 Line 58 "is"            should be --in--

Col. 23 Line 51 "trand"         should be --trend--

Col. 26 Line 10 "compressor"    should be --comparator--

Col. 29 Line 25 "off"           should be --of--

Col. 34 Line 32 "difference in" should be --difference is--

UNITED STATES PATENT AND TRADEMARK OFFICE
CERTIFICATE OF CORRECTION

PATENT NO. : 4,112,494
DATED : September 5, 1978
INVENTOR(S) : Peter F. and Kenneth D. Elliott It is certified that error appears in the above-identified patent and that said Letters Patent are hereby corrected as shown below:

Col. 36  Line 47  insert --a-- after "such as"

Col. 38  Line 19  insert --flow-- after "through said fluid"

Signed and Sealed this

Sixteenth Day of October 1979

[SEAL]

Attest:

RUTH C. MASON
Attesting Officer

LUTRELLE F. PARKER
Acting Commissioner of Patents and Trademarks